US010753792B2

(12) United States Patent
Ramer et al.

(10) Patent No.: US 10,753,792 B2
(45) Date of Patent: Aug. 25, 2020

(54) RECONFIGURABLE OPTICAL FIBER SPECTROMETER IN A LIGHTING DEVICE

(71) Applicant: ABL IP HOLDING LLC, Conyers, GA (US)

(72) Inventors: David P. Ramer, Reston, VA (US); Jack C. Rains, Jr., Sarasota, FL (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

(21) Appl. No.: 16/572,989

(22) Filed: Sep. 17, 2019

(65) Prior Publication Data

US 2020/0011733 A1 Jan. 9, 2020

Related U.S. Application Data

(63) Continuation of application No. 15/668,246, filed on Aug. 3, 2017, now Pat. No. 10,458,844, which is a
(Continued)

(51) Int. Cl.
*G01J 3/28* (2006.01)
*G01J 3/02* (2006.01)
(Continued)

(52) U.S. Cl.
CPC .......... *G01J 3/0218* (2013.01); *G01J 3/0264* (2013.01); *G01J 3/0291* (2013.01); *G01J 3/10* (2013.01);
(Continued)

(58) Field of Classification Search
CPC ...... G01J 3/0218; G01J 3/0264; G01J 3/0291; G01J 3/10; G01J 3/28; G01J 3/42; G02B 6/0006
See application file for complete search history.

(56) References Cited

U.S. PATENT DOCUMENTS 4,893,894 A 1/1990 Caimi
5,050,992 A 9/1991 Drummond et al.
(Continued)

OTHER PUBLICATIONS

Antoszewski et al., "Tunable Fabry-Perot filters operating in the 3 to 5 um range for infrared micro-spectrometer applications", Proc. of SPIE, 2, 2006, vol. 6186, 9 pages.
(Continued)

*Primary Examiner* — Tarifur R Chowdhury
*Assistant Examiner* — Jonathon Cook
(74) *Attorney, Agent, or Firm* — RatnerPrestia

(57) ABSTRACT

A spectrometer-equipped lighting device detects substances in an environment around the device. A fiber detector is optically coupled to receive light from a light source. The fiber detector has a bare area from which emanates an evanescent wave of light surrounding an exterior of the fiber detector to interact with the environment in which the fiber detector is exposed. The spectrometer, optically coupled to an opposite end of the fiber detector, detects the light output and in response, generates signals representative of the spectral power distribution of the light of the evanescent wave that has interacted with the surrounding environment. A controller analyzes the spectrometer generated signals and initiates action based on the analysis of the generated signals or outputs a report indicating an environmental condition detected by the spectrometer-equipped device.

12 Claims, 13 Drawing Sheets

Related U.S. Application Data continuation-in-part of application No. 15/247,076, filed on Aug. 25, 2016, now Pat. No. 10,281,326.

(51) Int. Cl.
  *G01J 3/42* (2006.01)
  *G01J 3/10* (2006.01)
  *F21V 8/00* (2006.01)

(52) U.S. Cl.
  CPC . *G01J 3/28* (2013.01); *G01J 3/42* (2013.01); *G02B 6/0006* (2013.01)

(56) References Cited

U.S. PATENT DOCUMENTS

| | | | |
|---|---|---|---|
| 5,082,629 A * | 1/1992 | Burgess, Jr. | G01N 21/552 356/128 |
| 6,560,546 B1 | 5/2003 | Shenk et al. | |
| 7,037,554 B2 * | 5/2006 | Tao | G01N 15/06 427/163.1 |
| 8,592,768 B1 | 11/2013 | Djeu | |
| 9,392,753 B2 | 7/2016 | Krijn et al. | |
| 9,451,668 B2 | 9/2016 | Bewick et al. | |
| 2002/0138210 A1 | 9/2002 | Wilkes et al. | |
| 2003/0109055 A1 | 6/2003 | Lehmann et al. | |
| 2006/0232779 A1 | 10/2006 | Shaw | |
| 2007/0045524 A1 | 3/2007 | Rains et al. | |
| 2007/0171649 A1 * | 7/2007 | Rains, Jr. | F21S 2/00 362/303 |
| 2007/0279636 A1 * | 12/2007 | Li | G01J 3/02 356/451 |
| 2009/0122317 A1 | 5/2009 | Ito et al. | |
| 2009/0195776 A1 | 8/2009 | Durst et al. | |
| 2009/0267540 A1 | 10/2009 | Chemel et al. | |
| 2010/0114514 A1 | 5/2010 | Wang et al. | |
| 2011/0251800 A1 | 10/2011 | Wilkins | |
| 2013/0293877 A1 | 11/2013 | Ramer et al. | |
| 2013/0307419 A1 | 11/2013 | Simonian et al. | |
| 2015/0271380 A1 | 9/2015 | Darty et al. | |

OTHER PUBLICATIONS

Chen et al., "Integrated diffraction grating for lab-on-a-chip microspectrometers", Proc of SPIE, 2205, vol. 5699, pp. 511-516.

Chen et al., "Miniature Bio-chemical Analytical System Based on Microspectrometer", Proceedings of SPIE, 2005, vol. 5719, pp. 95-101.

Crocombe et al., "Micro-optical instrumentation for process spectroscopy", Proceedings of SPIE, 2005, vol. 5591, pp. 11-25.

Keating et al., "Fabry-Pérot MEMS microspectrometers spanning the SWIR and MWIR", Proceedings of SPIE, 2007, vol. 6542, 8 pages.

Keating et al., "Optical Characterization of Fabry-Pérot MEMS Filters Integrated on Tunable Short-Wave IR Detectors", IEEE Photonics Technology Letters, May 1, 2006, vol. 18, No. 9, pp. 10749-1081.

Krippner et al., "Electromagnetically Driven Microchopper for Integration into Microspectrometers Based on the LIGA Technology", SPIE Conference on Miniaturized Systems with Micro-Optics and MEMO, Sep. 1999, vol. 3878, pp. 144-154.

Non Final Office Action for U.S. Appl. No. 15/247,076, dated Jun. 28, 2018, 24 pages.

Non Final Office Action for U.S. Appl. No. 15/369,276, dated Jul. 13, 2018, 21 pages.

Notice of Allowance for U.S. Appl. No. 15/369,276, dated Nov. 27, 2018, 13 pages.

Notice of Allowance for U.S. Appl. No. 15/247,076, dated Dec. 31, 2018, 13 pages.

Pervez et al., "Photonic crystal spectrometer", vol. 18, No. 8, Optics Express, Apr. 12k, 2010, pp. 8277-8285.

Rivas et al., "Tunable Single Pixel MEMS Fabry-Perot Interferometer", Optical Society of America, 3 pages.

Entire patent prosecution history of U.S. Appl. No. 15/668,246, filed, Aug. 3, 2017, entitled, "Reconfigurable Optical Fiber Spectrometer in a Lighting Device.".

\* cited by examiner

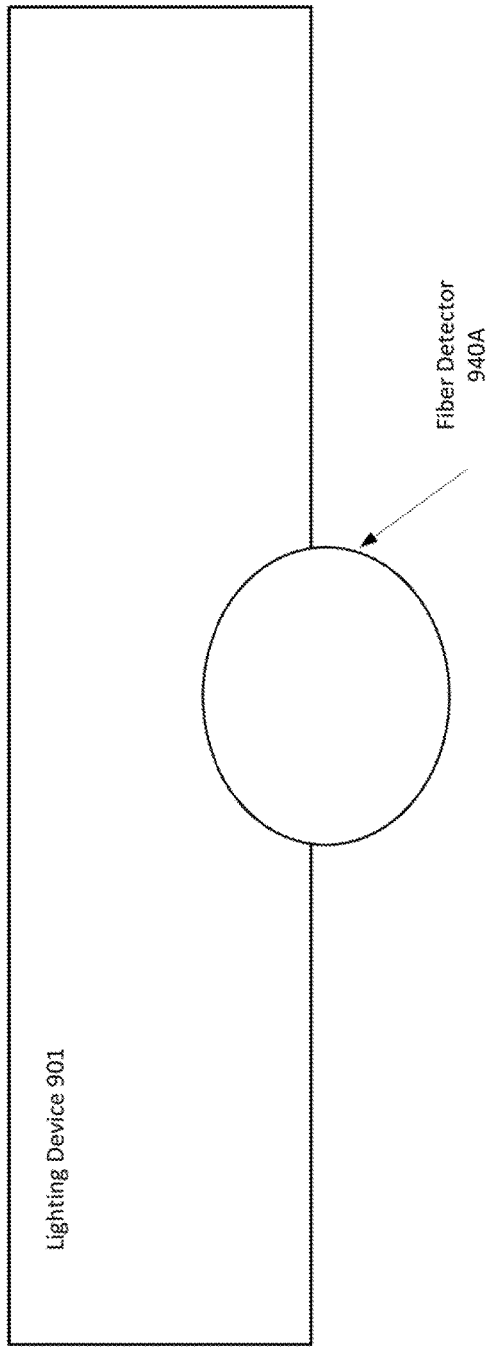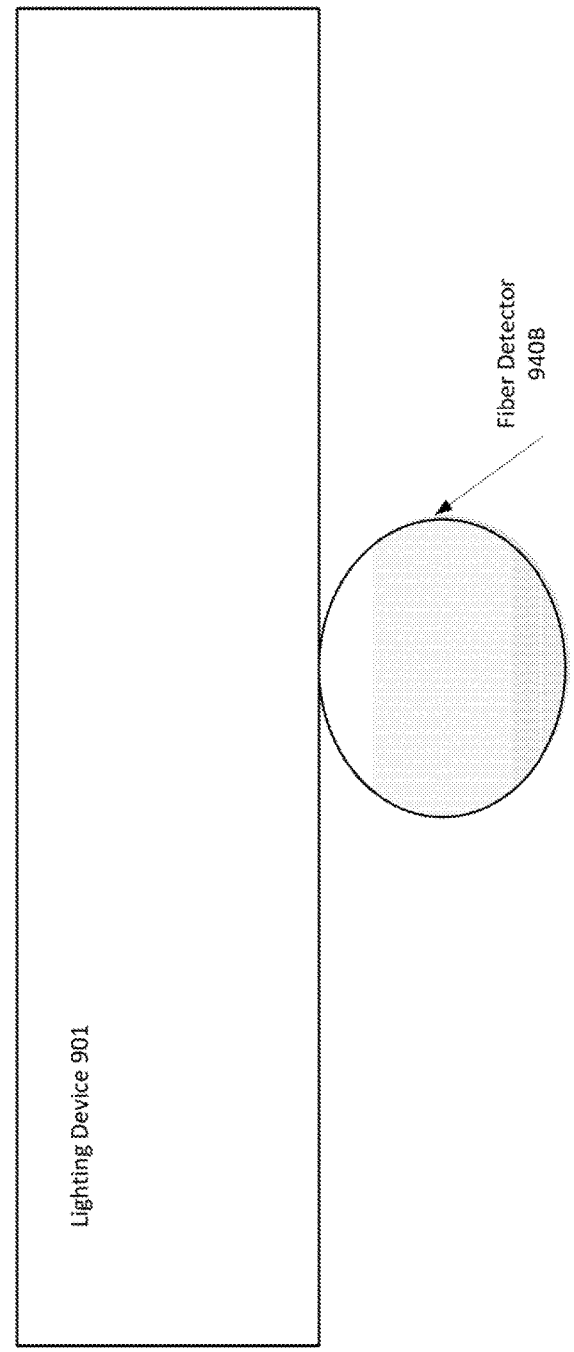

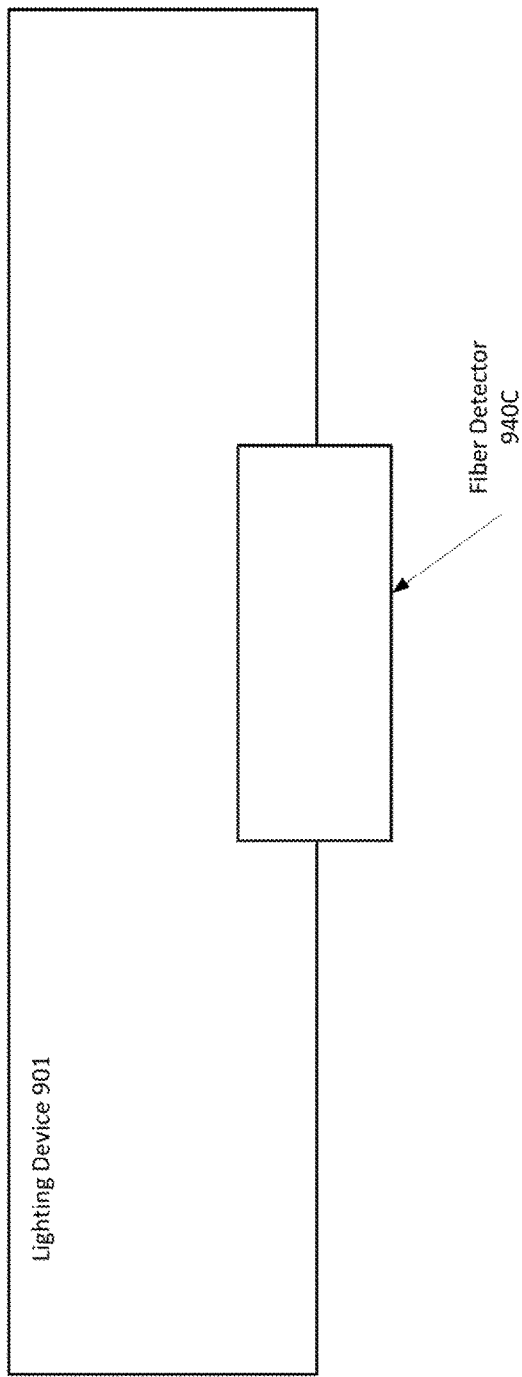
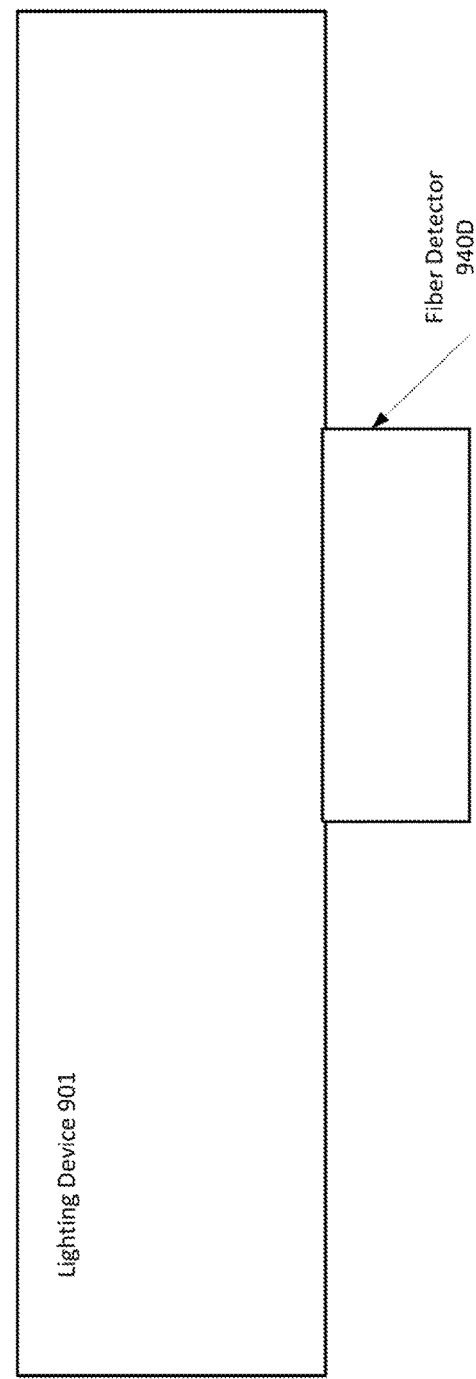

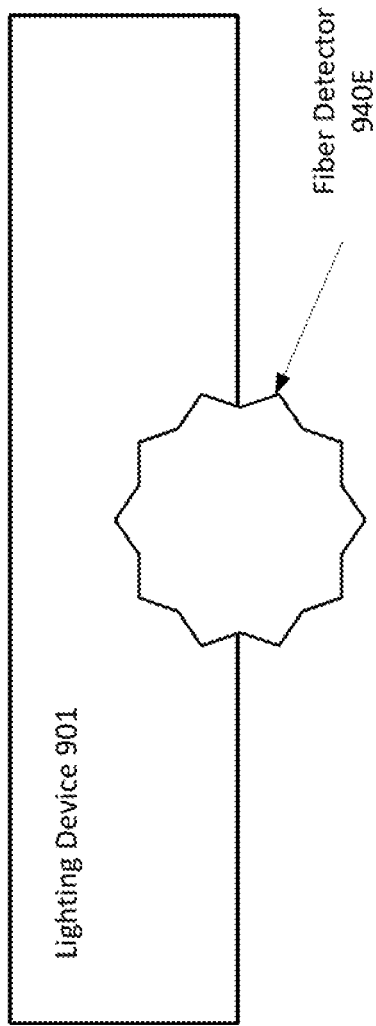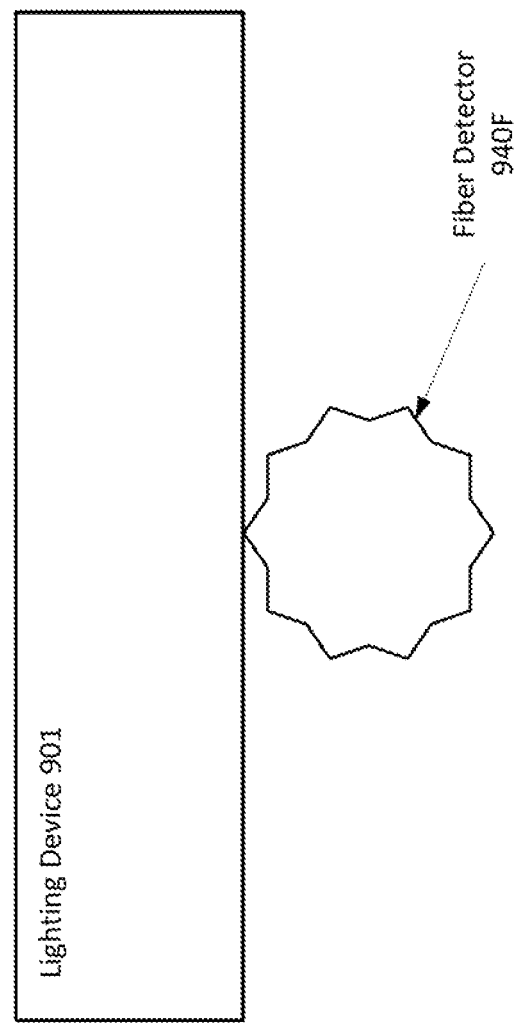

RECONFIGURABLE OPTICAL FIBER SPECTROMETER IN A LIGHTING DEVICE

CROSS REFERENCE TO RELATED APPLICATIONS

This application is a continuation of application Ser. No. 15/668,246, filed on Aug. 3, 2017, the entire contents of which are incorporated herein by reference.

Application Ser. No. 15/668,246 is a continuation-in-part of application Ser. No. 15/247,076 filed on Aug. 25, 2016, now U.S. Pat. No. 10,281,326 issued May 7, 2019, the entire contents of which are incorporated herein by reference.

BACKGROUND

After the invention of the light bulb, lighting devices have become ubiquitous in society. Nearly all private and public buildings and/or spaces have some form of a lighting device to provide some form of general illumination, whether it is to illuminate a room, hallway, street, roadway or the like. The number of lighting devices in the world numbers in the billions.

Since lighting devices are located in most populated areas, the lighting devices have also been used to provide functions besides lighting. For example, lighting devices have incorporated sensors such as room occupancy sensors that are used to control light, smoke detectors and/or gas detectors, such as sensors of carbon monoxide, carbon dioxide, or the like, that are used to alert persons in the vicinity of and/or remote from the lighting device of the presence of smoke and/or a harmful gas. Sensors integrated into lighting devices typically have been single purpose devices. For example, to implement occupancy sensing, smoked detection and carbon dioxide sensing in one lighting device might involve installation of three different types of sensors for the different purposes in one lighting device.

One device that may be used to analyze multiple chemicals simultaneously is a spectrometer. Spectroscopy is a valuable chemical analysis tool. A spectrometer is a device that measures the optical spectrum or wavelength(s) of received light. In particular, the optical power of individual bands within the electromagnetic spectrum including ultraviolet, visible light, and infrared, both the near-infrared (NIR) and thermal infrared, may be measured by a spectrometer. For example, spectrometers measure light reflected from a particular object or passing through the environment (e.g., air) that has been illuminated by a light source having known parameters or characteristics. The spectral output data may be values representing a spectral power distribution of the detected light. The spectral output data may be compared to known spectral values of different compounds, objects or the like to determine characteristics of an object reflected, shifted/retransmitted or passively transmitted by the light from the known light source. Spectrometers typically fall into three wavelength categories: (250-1000 nm) that includes Ultraviolet (U*V), visible, near infrared (NIR) light; (1000-3000 nm) that includes "mid-wave" light; and (3000-18000 nm) which includes thermal infrared. More typical is a filter that detects light in the wavelength range of 3000-5000 nm or 8000-1200 nm. For example, certain bacteria fluoresce when struck, for example, by ultraviolet or infrared light, and one or more wavelengths in the spectral power distribution of the emitted fluorescent light can be used to determine the type of bacterial being illuminated.

While cameras typically use red, green, and blue visible light filters when producing an image, spectrometers have a greater spectral resolution than cameras. A spectrometer detects intensity of a greater number of different wavelengths or wavelength bands than can be distinguished via a camera's few visible light filters. A spectrometer may be made using a larger number of narrowband light wavelength filters over an imaging device. Alternatively, a spectrometer may be made using a prism or a diffraction grating positioned such that the output of the prism is directed to an imaging device. The imaging device is responsive to the various wavelengths of light and outputs a signal representative of the incident intensity of the light of each particular narrow wavelength band. Based on the incident wavelength intensity, a computer processor is able to determine a type or even the chemical composition of an object passing, reflecting or emitting the light in the particular spectral power distribution. Spectrometers may be configured to analyze multiple chemicals simultaneously.

New spectrometer technology is being drastically reduced in price and size. Spectrometers previously cost 10s of thousands of dollars and were large. The smallest of these spectrometers could only fit on top of a desk. However, in recent years, spectrometers have become small enough to fit in a person's hand. Less precise than a spectrometer is a spectral sensor that is able to sample a couple, or a few, wavelengths.

An optical fiber cable is made up of threads of glass or plastic known as optical fibers such that one cable can have as few as two threads or as many as several hundred threads, each of which is capable of transmitting data modulated into light waves. Optical fibers typically include a transparent core having a higher index of refraction surrounded by a transparent cladding material with a lower index of refraction. Light is kept in the core by the phenomenon of total internal reflection which causes the fiber to act as a waveguide. Some light travels in the cladding as an evanescent wave, which includes all the wavelengths of the light that are outputted by the light source. Some recently developed spectrometers have the capability of receiving signals from optical fiber cables. The cladding material, however, helps limit loss of light from the fiber cable into the region around the cable.

While others have suggested the integration of a spectrometer with a fixture lens, those suggested integrations had limitations not only due to spectrometer size and processing power present at the respective light fixture but also due to limited flexibility in the system. As such, only limited functionality was described or suggested. In addition, updating the capability of a spectrometer previously may have required replacing the spectrometer, which after being collocated with a light fixture presents challenges that were expensive and time consuming.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 9A-9F illustrate, in a general functional block diagram form, examples of various shapes of fiber detectors and positioning of the fiber detectors with respect to the lighting device.

DETAILED DESCRIPTION

Figure 1:
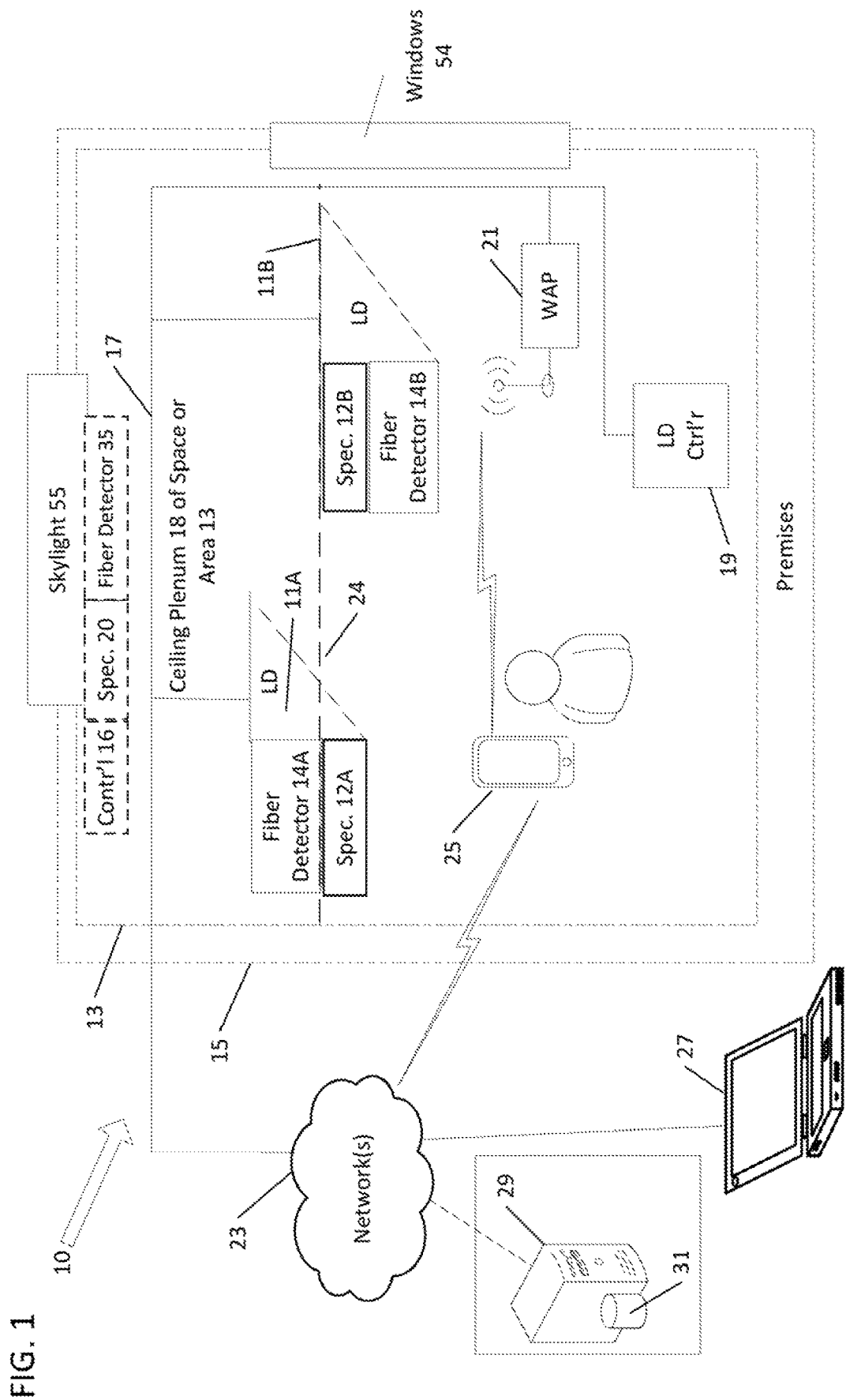
FIG. 1 illustrates a general example of a system incorporating fiber detectors and configurable spectrometers in a variety of artificial lighting and daylighting type lighting devices.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A need exists for improvement in both the flexibility and performance of a system by providing a fiber detector to direct light from the light source to the spectrometer that cooperate with a lighting device in order to provide an analysis of the environment in which the lighting device is installed. The fiber detector is a physical structure that guides electromagnetic waves in the optical spectrum and allows some light flowing along the fiber to interact with the surrounding environment. Common types of fiber detectors include optical fiber cables and waveguides. Using the fiber detector as an optical interface for the spectrometer provides for a simpler installation and also allows for several deployment options, thereby improving the overall performance of the system.

Disclosed is an example of a system, including a light source, a fiber detector, a spectrometer, a communication interface, a memory, and a processor. The light source within a housing is configured to output light for general illumination and to provide light to the fiber detector. In this example, the fiber detector is configured to enable light from the light source to interact with the environment via an evanescent wave that emanates from the exposed portion of the fiber detector. The spectrometer, also within the housing, is configured to detect the interacted light and generate signals representing a spectral power distribution of the detected light. The communication interface is coupled to a communication network. The memory stores spectral reference data and program instructions for analyzing the spectrometer generated signals. The processor is coupled to the memory, the communication interface, the light source and the spectrometer, and when executing the stored program instructions is configured to perform functions. The processor controls operation of the light source, analyzes the signals generated by the spectrometer in response to detecting light in relation to reference data to detect an environmental condition in the environment in which the lighting device is located; and outputs, via the communication interface, a report of the detected environmental condition.

In another example, a lighting device includes a housing, a light source, a fiber detector, a spectrometer and a processor. The light source is configured to provide general illumination light. In one example, the fiber detector is an optical fiber cable having an exposed portion without cladding, which is integrated within the device together with the light source. The fiber detector, also within the housing, is configured to enable light flowing along the fiber to interact with the environment via an evanescent wave that emanates from the exposed portion of the fiber detector, and to deliver light from the light source that has interacted with the environment to the spectrometer, thus functioning as an optical interface for the spectrometer. As light travels via the fiber detector, the evanescent wave emanates from the exposed portion or bare area of the fiber detector and surrounds an exterior of the exposed or bare portion of the fiber detector. The light of the evanescent wave interacts with the medium in the environment around the bare area of the fiber detector. The interaction with the medium in the environment diminishes a spectral characteristic of the traveling light in the fiber detector, and the fiber detector carries the interacted light to the spectrometer for spectral analysis.

For example, the evanescent light wave in the region of the environment around the exposed portion of the fiber interacts with at least a portion of a medium, such as air, another gas, or a liquid, from the environment in which a lighting device or fiber detector is located; and the spectrometer is configured to receive light after the light has interacted with the medium in the environment. The processor is coupled to process spectral power distribution measurements from the spectrometer to selectively detect each of a plurality of different environmental conditions. In another example, the fiber detector is a waveguide, which functions similar to the optical fiber cable as discussed above.

Spectroscopy is a valuable, adaptable chemical analysis tool. For example, a spectrometer can be used to analyze the environment around the spectrometer for multiple chemicals, particulates, contaminants or the like, either airborne or on a surface, simultaneously. New spectrometer technology is being drastically reduced in price and size. Structures where lighting products and building management products reside would benefit from a more comprehensive analysis of the environment around them than offered by use of special purpose sensors in or around the lighting devices. For example, a building high volume air conditioning (HVAC) control system can take advantage of detection of humidity ($H_2O$), carbon monoxide (CO), carbon dioxide ($CO_2$), smoke, natural gas, biological material (e.g., bacteria (Methicillin-resistant *Staphylococcus aureus* (MRSA), viruses, blood, or the like), other noxious gases, solids, liquids or the like to report on sensed conditions and/or to adjust operation of one or more controllable components of the HVAC system. These chemicals, particulates, contaminants or the like, either airborne or on a surface, will be referred to herein generally as "substances." The system incorporating the spectrometer as described herein can be configured to look for new substances by receiving a software or firmware update in order to detect the new substances. The analysis of chemicals, particulates, contaminants or the like, either airborne or on a surface, by the spectrometer is referred to herein as environmental analysis. Environmental analysis also may involve the collection or detection by the spectrometer of the substances, the subsequent analysis performed by a processor, and the output of an analysis result.

Other systems that may benefit from environmental analysis by adding a spectrometer and related hardware to a lighting system include community water systems to constantly monitor, for example, for lead (Pb) and/or other chemicals, particulates, contaminants.

The examples discussed below relate to incorporating a spectrometer into a lighting device and use of the spectrometer for lighting related operations and/or for other detection functions. The spectrometer is coupled to receive light via an optical fiber, configured as a fiber detector. In some (but not all) examples, the fiber detector is incorporated in the lighting device with the spectrometer. As discussed above, a fiber detector is a physical structure that guides electromagnetic waves in the optical spectrum and allows some light flowing along the fiber to interact with the surrounding environment. Common types of fiber detectors include optical fiber cables and waveguides, e.g. with an exposed or bare area.

The term "lighting device" as used herein is intended to encompass essentially any type of device that processes generates or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. However, it is also possible that one or more lighting devices in or on a particular premises have other lighting purposes, such as signage for an entrance or to indicate an exit. In most examples, the lighting device(s) illuminate a space or area of a premises to a level useful for a human in or passing through the space, e.g. general illumination of a room or corridor in a building or of an outdoor space such as a street, sidewalk, parking lot or performance venue, and serve to provide components usable in identifying chemical composition, biological materials and/or environmental materials in the environment in which the lighting device is located. The actual source of light in or supplying the light for a lighting device may be any type of light emitting, collecting or directing arrangement. The term "lighting device" encompasses passive lighting devices that collect and supply natural light as well as artificial lighting devices that include a source for generating light.

The term "passive lighting" as used herein is intended to encompass essentially any type of illumination that a device supplies without consuming power to generate the light. A passive lighting device, for example, may take the form of a daylighting device that supplies daylight that the device obtains outside a structure to the interior of the structure, e.g. to provide desired illumination of the interior space within the structure with otherwise natural light. As another example, a passive lighting device may include a phosphor or other wavelength conversion material, to enhance the light in a desired manner without consuming electrical power.

The term "artificial lighting" as used herein is intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

The term "coupled" as used herein refers to any logical, physical or electrical connection, link or the like by which signals, data, instructions or the like produced by one system element are imparted to another "coupled" element. Unless described otherwise, coupled elements or devices are not necessarily directly connected to one another and may be separated by intermediate components, elements or communication media that may modify, manipulate or carry the signals. For example, system elements may be coupled for wired or wireless communication.

Reference is now made in detail to the examples illustrated in the accompanying drawings and discussed below.

The example of FIG. 1 illustrates a system 10 for communicating with a number of lighting devices (each labeled "LD" in FIG. 1), one or more of which incorporates a spectrometer coupled to a fiber detector enabling the spectrometer to operate as a reconfigurable sensing element, e.g. based on a user selection and/or a software update. For example, elements of the lighting device may be "reconfigurable" e.g. to compare output results from the spectrometer to different references to identify different substances. In the example, each of the lighting devices 11A and 11B is equipped with a spectrometer 12A or 12B. As shown, each device 11A or 11B also includes a fiber detector 14 or 14B, although in later examples, a fiber detector may instead be connected between lighting devices.

Figure 7:
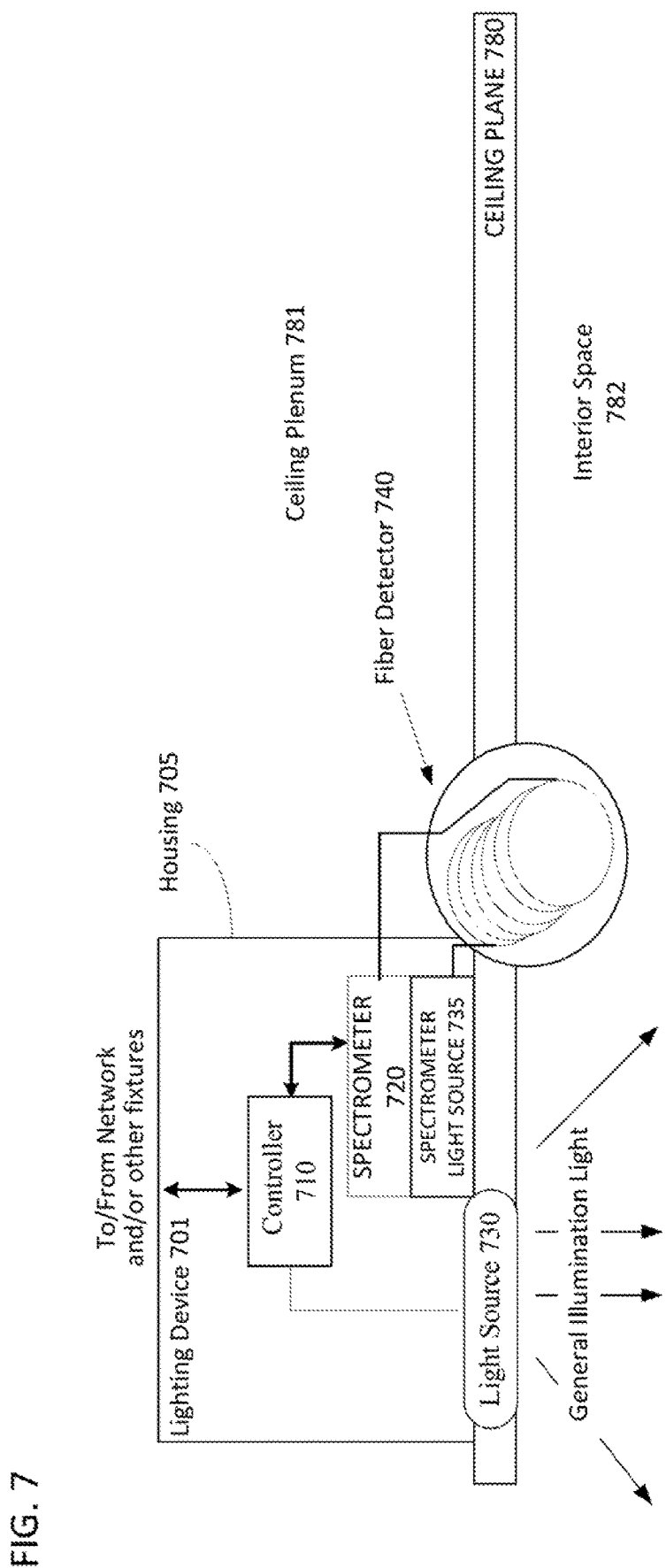
FIG. 7 illustrates an example of an implementation of a lighting device with a fiber detector and a spectrometer to analyze the air or an object in the environment in which the lighting device is located.
Figure 8:
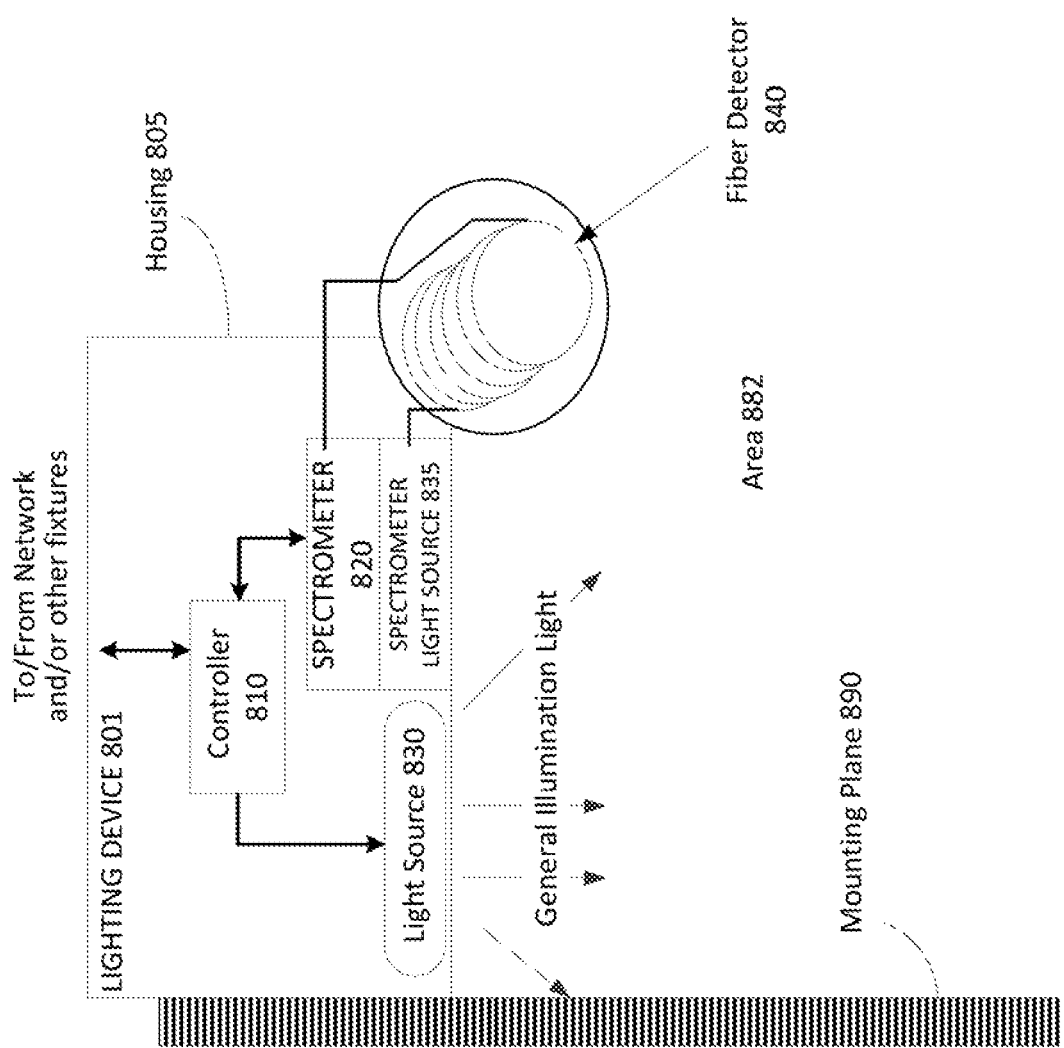
FIG. 8 illustrates another example of an implementation of a lighting device with a fiber detector and a spectrometer to analyze the air or an object in the environment in which the lighting device is located.

Each spectrometer 12A or 12B may operate as a reconfigurable sensing element. The fiber detector has an exposed portion that loses some light to the medium in the environment around bare or exposed area surrounding an exterior of the fiber detector, for example, light attenuated through interaction with substance(s) (more broadly referred to above as medium) in the environment. The fiber detector supplies this attenuated light to the spectrometer. The spectrometers, as well as some other elements of system 10, are installed within a space or area 13 to be illuminated and/or subject to analysis by the spectrometer 12A or 12B at a premises 15. The premises 15 may be any location or locations serviced for lighting and other purposes by such system of the type described herein. Most of the examples discussed below focus on building installations, although the examples of FIGS. 7-8 illustrate systems that have been adapted to outdoor lighting and environmental analysis. Hence, the example of system 10 may provide lighting, environmental analysis and possibly other services in a number of service areas in or associated with a building, such as various rooms, hallways, corridors or storage areas of a building (e.g., home, hospital, office building, schools, and an outdoor area associated with a building. Any building forming or at the premises, for example, may be an individual or multi-resident dwelling or may provide space for one or more enterprises and/or any combination of residential and enterprise facilities.

A lighting device may be a luminaire capable of generating artificial illumination; and in such a configuration, a spectrometer-equipped luminaire type lighting device would include a suitable powered light source. The respective powered light source in each of the lighting devices 11A and 11B is configured to output light not only for general illumination but also to provide to the respective fiber detectors 14A and/or 14B. The space or area 13 of premises 15 may also be illuminated by natural light that enters through windows 54 and skylight 55. The skylight 55 may be in the form of a spectrometer-equipped device that is installed in the roof of premises, such as 15, to illuminate an area or space, such as 13, and that is equipped with a spectrometer. In one implementation, a spectrometer 20 with a controller 16 may be coupled to the skylight 55. In one implementation, a fiber detector 35 is optically coupled to the spectrometer 20. Similarly, the window 54 and spectrometer 20 may be configured such that the window 54 is equipped with the spectrometer. In such a configuration, the window 54 may also be a spectrometer-equipped device. The controller 16 may include a processor and memory, examples of which are explained in more detail with reference to the elements of controller 204 of FIG. 2. The controller 16 may use the spectrometer 20 to perform an environmental analysis of air and surfaces based on the natural light passing through the skylight 55. For example, the natural light may illuminate the air or a surface in the vicinity of the skylight 55, and some of the natural light travels via the fiber detector 35a, which is detected by spectrometer 20 as reflected or incident light, output signals representative of an overall optical power intensity as well as optical power distribution of the detected light. The controller 16 analyzes the signals generated by the spectrometers 12A, 12B and 20 in response to detecting light in relation to reference data, for example, for control purposes, for communications regarding detection results, etc.

The system elements, in a system like system 10 of FIG. 1, may include any number of lighting devices 11A or 11B equipped with a spectrometer that operates as a reconfigurable sensor as well as one or more lighting controllers 19. Lighting controller 19 may be configured to provide control of lighting related operations (e.g., ON/OFF, intensity, brightness, image control signals and general illumination control signals) of lighting devices 11A and 11B. Alternatively, or in addition, lighting controller 19 may be configured to provide control of the spectrometer aspects of lighting devices 11A and 11B, as described in greater detail below. That is, lighting controller 19 may take the form of a processor, such as a switch, a dimmer, or a smart control panel including a user interface depending on the functions to be controlled through device 19. The lighting controller 19 may send commands to the lighting device 11A or 11B that are executed by processing elements (described in more detail with reference to other examples below) present in the lighting devices 11A and 11B. The lighting system elements may also include one or more spectrometers 12A, and/or 12B used to control lighting functions, similar to control by sensors such as occupancy sensors, ambient light sensors and light, temperature sensors or environmental analysis that detect conditions relative to or produced by one or more of the lighting devices. The spectrometer 12A or 12B may be implemented in intelligent standalone system elements, or the spectrometer 12A or 12B may be incorporated in one of the other system elements, such as lighting devices 11A and 11B and lighting controller 19.

The on-premises system elements 11A, 11B, 12A, 12B, 19, in a system like system 10 of FIG. 1, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations of lighting devices 11A and 11B. Such a user terminal is depicted in FIG. 1, for example, as a mobile device 25 within premises 15, although any appropriate user terminal may be utilized. However, the ability to control operations of lighting devices 11A and 11B may not be limited to a user terminal accessing data network 17 via WAP 21 within premises 15. Alternatively, or in addition, a user terminal such as laptop 27 located outside premises 15, for example, may provide the ability to control operations of lighting devices 11A and 11B via one or more other networks 23 and the on-premises network 17. Network(s) 23 includes, for example, a local area network (LAN), a metropolitan area network (MAN), a wide area network (WAN) or some other private or public network, such as the Internet.

For lighting operations, the system elements for a given service area such as devices 11, spectrometers 12A, 12B and/or controller(s) 19 are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 1. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 in the example also includes server 29 and database 31 accessible to a processor of server 29. Although FIG. 1 depicts server 29 as located outside premises 15 and accessible via network(s) 23, this is only for simplicity and no such requirement exists. Similarly, although FIG. 1 depicts database 31 as physically proximate server 29, this is only for simplicity and no such requirement exists. Instead, database 31 may be located physically disparate or otherwise separated from server 29 and logically accessible by server 29, for example via network 17.

Database 31 may be a collection of spectral reference data files for use in conjunction with the reconfigurable sensor that includes a spectrometer 12A or 12B. For example, each spectral reference data file within database 31 includes reference data related to one or a combination of various different substances, such as different types of chemicals, biological materials, particulates and contaminants, such as smoke, carbon monoxide, carbon dioxide, MRSA, natural gas, or the like. In one example, such reference data is retrieved from a literature and stored in the database 31. The reference data may include optical power intensity values for different wavelengths or narrow wavelength bands of visible, and infrared light that are used by a processor of the server 29 when executing program instructions stored in the database 31 to detect the presence of one or more substances depending upon the reference spectral power distribution data included in the spectral reference data file. In one example, such reference data is provided as part of the specifications of the light source as manufactured. In one example, a selected spectral reference data file from among the collection of spectral reference data files is loaded into a memory of the spectrometer-equipped lighting devices 11A and 11B, and the spectrometer-equipped lighting devices 11A and 11B are configured to detect and output a detection result in accordance with the reference data included in the selected spectral reference data file. That is, the selected spectral reference data file enables lighting devices 11A and 11B to be reconfigured to detect a specific list of chemicals, particulates, contaminants or the like for environmental analysis.

In the example, both the lighting devices 11A and 11B store the same reference data file to their respective memories (not shown). It should be appreciated, however, that different lighting devices may store different reference data files to selectively configure the respective spectrometers 12A and 12B to detect different substances. For example, lighting device 11A may be configured to detect the presence of smoke, which lighting device 11B may be configured to detect carbon monoxide.

It should also be noted that, while various examples describe loading a single spectral reference data file into the respective memories of lighting devices 11A and 11B, this is only for simplicity. Lighting devices 11A and 11B may receive one, two or many spectral reference data files and each received file may be stored within lighting devices 11A and 11B. In such a situation, lighting devices 11A and 11B may, at various times, operate in accordance with spectral reference data in any one of multiple files, e.g. operate in accordance with first spectral reference data during daylight hours and in accordance with second spectral reference data during nighttime hours or in accordance with different file selections from a user operator at different times, and the like. Alternatively, lighting devices 11A and 11B may only store a single spectral reference data file.

The lighting devices 11A and 11B may have different configurations, and may be implemented using different and/or similar components. For example, a device, such 11A, may be installed within a ceiling plenum 18 of an area or space 13. The lighting device 11A may protrude into the ceiling plenum 18 of the area or space 13, while the light output surface (not shown in this example) from the lighting device 11A may be substantially coplanar with the ceiling plane 24. The device 11A is shown with a fiber detector 14A, such as optical fiber cable, which in the example is a coil of fiber, a portion of which is exposed so that some light interacts with the environment in the ceiling plenum 18 in the space 13. As discussed above, as the light travels via the fiber detector 14A, an the evanescent wave of the light surrounding the exposed portion of the fiber detector 14A interacts with a medium in the surrounding environment, which diminishes a spectral characteristics of the travelling light to the fiber detector 14A. The light is outputted from the fiber detector 14A via an optical coupling with the spectrometer 12A and is detected by the spectrometer 12A. The spectrometer 12A generates signals corresponding to spectral analysis of the intensities at different wavelengths of the detected light as described in greater detail below. In an optional configuration, the device 11B may be configured with another fiber detector 14B, which functions similar to the fiber detector 14A except that a portion of the fiber of detector 14B is exposed to the environment below the ceiling plenum 18 in the space 13, and output of the light from the fiber detector 14B is detected by the spectrometer 12B. The spectrometer 12B is configured to function similar to the spectrometer 12A.

In yet one option, only one fiber detector may be used either in the ceiling plenum 18 or below the ceiling plane 24 in the ceiling plenum 18. Similarly, in yet another option, only one spectrometer 12 may be used either in the ceiling plenum 18 or below the ceiling plane 24 in the space 13. In another option, same fiber detector may be used both above and below the ceiling plenum 18. As will be described in examples of FIGS. 5 and 6, the devices 11A and 11B may cooperate with one another to detect substances in the environment, such as the ceiling plenum 18, below the ceiling plane 24 in the space 13, or both. The ceiling plenum 18 is bounded by ceiling plane 24 and the bottom of the floor or roof (not shown) of the space 13

To fully appreciate the present concepts, it may be useful to discuss examples of a spectrometer-equipped lighting device in somewhat more detail. Hence, the following discussion provides examples of configurations for implementing a spectrometer-equipped lighting device in the system 10 of FIG. 1.

Figure 2:
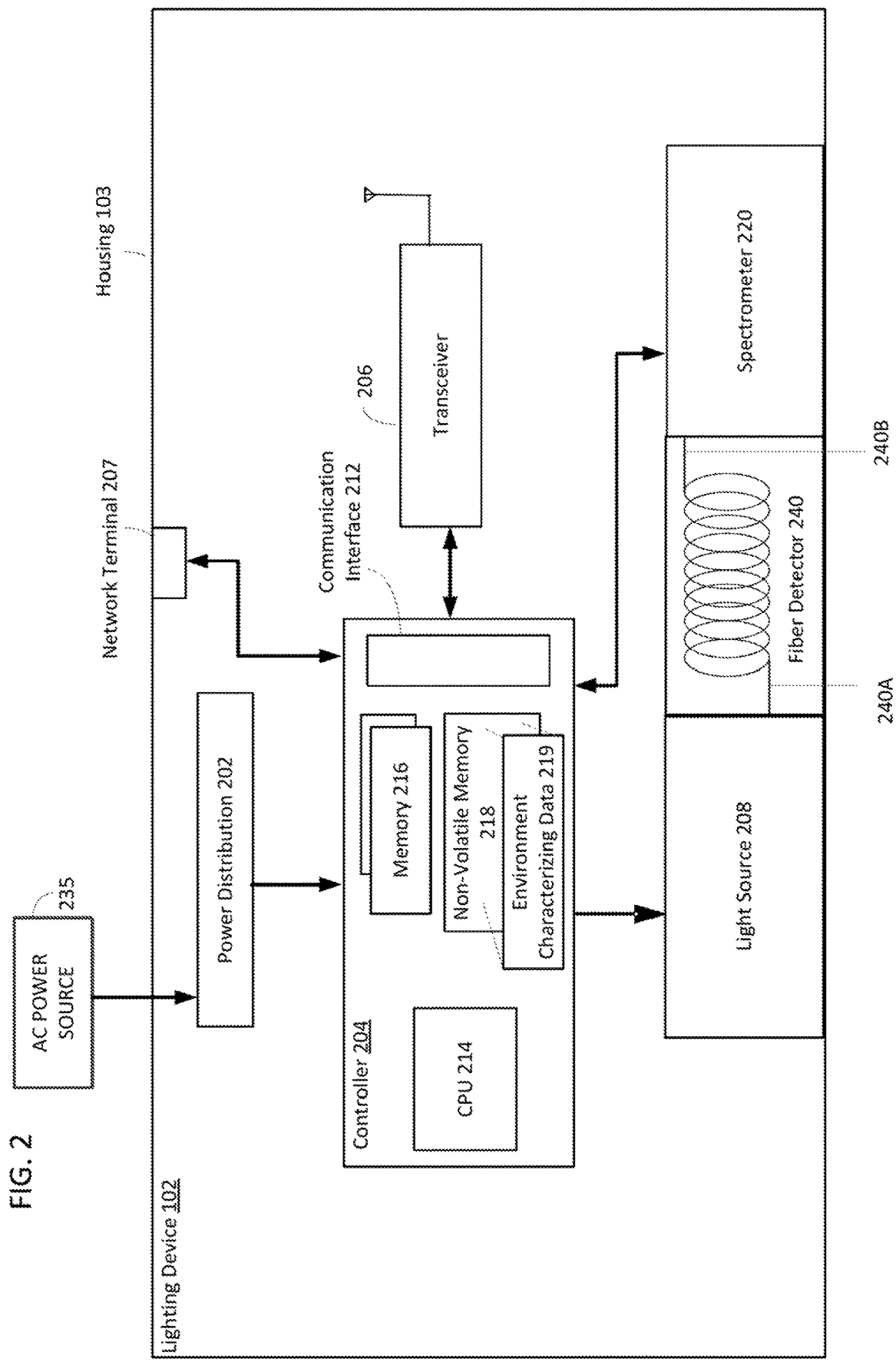
FIG. 2 is a functional block diagram illustrating details of an artificial lighting example of a device incorporating a fiber detector and a spectrometer as described herein.

FIG. 2 is a functional block diagram illustrating details of a device incorporating a fiber detector and a spectrometer as described herein. An example of a lighting device (device) 102 is shown in FIG. 2 where the device 102 includes a housing 103, a light source 208, a fiber detector 240, a spectrometer 220, a controller 204, a transceiver 206, and a network terminal 207. Specifically, first end 240A of the fiber detector 240 is optically coupled to the light source 208 and a second (or opposite) end 240B of the fiber detector 240 is optically coupled to the spectrometer 220. In one implementation, the fiber detector 240 is coupled to the spectrometer 220 and the light source 208 via a fiber optic coupling connector (not shown). The light source 208 is configured to output light for general illumination and to provide to the fiber detector 240 as described in greater detail below.

In one implementation, the first end 240A of the fiber detector 240 receives the light from the light source 208. As discussed above, a significant portion of the light travels in the cladding of the fiber detector 214 as an evanescent wave. Some of the evanescent wave surrounding an exterior of the fiber detector 240 emanates from a bare area or an exposed portion of the fiber detector 240 (having no cladding) and interacts with a medium in the environment surrounding the exposed portion of the fiber detector 240. The light is outputted from the second end of the fiber detector 240, which is detected by the spectrometer 220. The spectrometer 220 is configured to measure the difference in the intensity of light at different wavelengths inputted at the first end 240A of the fiber detector 240 and the intensity of light outputted at the different wavelengths at the second end 240B of the fiber detector 240. In one example, the light intensity at the first end 240A of the fiber detector 240 is in the wavelength range of 400 nm to 700 nm and the light intensity at the second end 240B of the fiber detector 240 is in the range of 100 nm to 500 nm. In another example, the light intensity at the first end 240A of the fiber detector 240 is in the range 1 microns to 6 microns and the light intensity at the second end 240B of the fiber detector 240 is in the range of 700 nm to 2 microns. In a further example, the light intensity at the first end 240A of the fiber detector 240 is in the range of 8-18 microns and the light intensity at the second end 240B of the fiber detector 240 is in the range of 2-8 microns. Such examples are just a few measurements of wavelength ranges of light intensity of the fiber detector, it is known to one of ordinary skill in the art that there may be many other various measurement of ranges of wavelengths of light intensity at each of end of the fiber detector. In one implementation, the intensity of the light outputted at the second end 240B of the fiber detector 240 is lower than the intensity of the light inputted at the first end 240A of the fiber detector 240 in response to the evanescent wave's exposure to the medium in the environment surrounding the exterior portion of the fiber detector 240. The spectrometer 220 generates spectral power signals (signals) corresponding to spectral power distribution of the measured light at different wavelengths. The spectral power distribution of the measure light indicates the differences in the amount of radiant power emitted by the light source 208 and the amount of radiant power detected by the spectrometer 220 at different wavelengths. The radiant power emitted by the light source 208 diminishes as the travel via the fiber detector to the spectrometer 220 such that the amount of the radiant power detected by the spectrometer 220 is lower than the amount emitted by the light source 208. In one example, the medium in the environment is carbon dioxide ($CO_2$), which interferes with the light to cause a spectral characteristics (such as the radiant power) of the travelling light to diminish as it travels via the fiber detector 240. Although $CO_2$, is one example of a gas in the medium, it is known to one of the ordinary skill in the art that other types of gases, or liquids, or solids or other biological or chemical material in the environment may interfere with the light.

The communication interface 212 is coupled to a data communication network via either the transceiver 206, the network terminal 207, or both. The controller 204 has an internal processor configured as a central processing unit (CPU) or a processor 214, a memory 216, a non-volatile memory 218 and a communication interface. The memory 216 or 218 stores spectral reference data and program instructions for analyzing the spectrometer 220 generated signals. The processor 214 is coupled to the memory 216, the non-volatile memory 218 and the communication interface 212, the light source 208 and the spectrometer 220. The processor 214, when executing the stored program instructions is configured to perform various functions related to the analysis of signals generated by the spectrometer 220 (described in more detail below.) The processor 214 and associated memories 216 and 218 in the example of the device 102 are components of the controller 204, which is a microchip device that incorporates the CPU as well as one or more memories. The controller 204 may be thought of as a small computer or computer-like device formed on a single chip. Alternatively, the processor 214 and memory 216 or 218 may be implemented as separate components, e.g. by a microprocessor, ROM, RAM, flash memory, etc. The housing 103 may serve to protect the components of the device 102 from the dust, dirt, water (e.g. rain) or the like in the location in which the device is installed.

Also included in the example device 102 is a power distribution unit 202 receiving power from an external alternating current (AC) power source 235. The power distribution unit 202 is configured to distribute electrical power to the various components within the device 102. For example, the light source 208 is an artificial light generation device configured to generate illumination upon consumption of electrical power from a power source, such as 235.

This example of the device 102 includes the capabilities to communicate over two different radio frequency (RF) bands, although the concepts discussed herein are applicable to control devices that communicate with luminaires and other system elements via a single RF band. Hence, in the example, the device 102 includes a transceiver 206, which may be configured for sending/receiving control signals, and/or for sending/receiving pairing and commissioning messages. For example, the transceiver 206 may be one or more transceivers configured as a 900 MHz transceiver for such an implementation a variety of controls are transmitted over the 900 MHz control band of the wireless control network, including, for example, turn lights on/off, dim up/down, set scene (e.g., a predetermined light setting), and sensor trip events. Alternatively, the transceiver 206 may be configured as a 2.4 GHz transceiver for Bluetooth low energy (BLE) that carries various messages related to commissioning and maintenance of a wireless lighting system. The transceiver 206 coupled to the communication interface 212 and to a wireless network, such as 23 or 17 via the wireless access point 21 of FIG. 1. The transceiver 206 is, for example, configured to transmit the detection signals output by the processor 214 to a device, such as such as devices 25, 29 and/or 27 of FIG. 1, external to the environment in which the lighting device 102 is located. In one implementation, the transceiver 206 is configured to communicate with a standard fiber optical communication network (not shown), In another implementation, the transceiver 206 is configured to communicate with a wired communication network, for example, Ethernet (not shown). Such implementations are just a few examples of communications network that the transceiver is coupled to, it is known to one of ordinary skilled in the art that the transceiver may be coupled to many different types of communication networks.

In the example of FIG. 2, device 102 is shown as having one processor 214, for convenience. In some instances, such a lighting device may have multiple processors. For example, a particular device configuration may utilize a multi-core processor architecture. Also, some of the other components, such as the communications interfaces, may themselves include processors.

In general, the controller 204 of the device 102 controls the various components of the device 102 and devices, such as the light source 208 and spectrometer 220, connected to the controller 204. For example, controller 204 may control RF transceivers 206 to communicate with other RF devices (e.g. wall switches, sensors, commissioning device, etc.). In addition, the controller 204 controls the light source 208 to turn ON/OFF automatically, or at the request of a user. In addition, controller 204 controls other aspects of operation of the light source 208, such as light output intensity level, or the like.

The controller 204 also controls the spectrometer 220240. For example, the controller 204 may perform the general functions of turning the spectrometer ON or OFF, receiving data from the spectrometer 220, and the like, 240. Alternatively, the spectrometer 220 240 may remain ON continuously since electrical power is received from electrical AC mains, such as AC power supply 235 in which case, power conservation may not be a design consideration.

The device 102 may receive a spectral reference data file via the communication interface. For example, the spectral reference data includes a number of reference spectral power distributions of which each reference spectral power distribution uniquely identifies a substance, such as a chemical composition, a biological material, or an environmental material. For example, each of the chemical compositions, biological materials and environmental materials may have a unique identifier associated with it. An "identifier" may be a code or series of values that corresponds to a different substance (chemical composition, biological material or environmental condition, such as the presence of smoke, or the like). For example, the spectral reference data may include the identifier, related to one or more of bacteria, viruses, explosives or chemical components thereof, smoke, carbon monoxide, carbon dioxide, natural gas, or the like, that corresponds to one or more of the signals generated by the spectrometer as well as other information such as values that indicate harmful levels of the substance, substance names or the like. The received spectral reference data file is stored in the memory 216 or 218. The memory 216 or 218 in addition to the spectral reference data may also store program instructions for analyzing the spectrometer 220 generated signals.

In a further example of the operation of the example of FIG. 2, the processor 210 receives via the communication interface 212 an updated spectral reference data. The updated spectral reference data may include updated reference spectral power distributions uniquely identifying a chemical composition, a biological material, or an environmental material (or condition) for comparison to the spectral power distributions output by the spectrometer 220. In one implementation, the spectral reference data may be updated due to changes in the light source 208. In one example, the intensity of the light source 208 may diminish due to aging over a period of time. In one implementation, the spectral reference data is updated due to changes in light received from natural light source via skylight 55 and/or window 54 as illustrated in FIG. 1. For example, the intensity of light may change from daylight hours to nighttime hours or vice versa. Alternatively or in addition, the updated spectral reference data changes from previously stored spectral reference data, one or more of a number of the reference spectral power distributions uniquely identifying a different chemical composition, a different biological material, or a different environmental material. Alternatively or in addition, the updated spectral reference data may change one or more of the number of the chemical composition identifier, the biological material identifier, or the environmental material identifier stored in the memory 216 and/or 218.

The processor 214 is configured to communicate the spectral power distribution measurements or information, such as an identifier associates with identified chemical compositions, biological materials about environmental conditions detected by the spectrometer 220 over a network via the communication interface 212. For example, the processor 214 receives signal generated by the spectrometer 220. As discussed above, the signal corresponds to the power distribution of the measured light at different wavelengths. In one implementation, the processor 214 processes the signal generated by the spectrometer. Specifically, the processor 214 of the controller 204 may access the stored data file in the memory 216 and/or 218, and analyzes the signal with respect to the spectral reference data stored in the memory 216 and/or 218 to determine a chemical composition of the air in an exterior of the fiber detector (explained in more detail with reference to the examples of FIGS. 3A-8). For example, the spectral reference data stored in the memory may be a data file containing data directed to a particular substance having a specific chemical composition identifiable from the spectrometer generated signal. Although, not shown, in one implementation, the processor 214 may reside in the spectrometer 220.

Returning to the example, an identifier in the spectral reference data file for one composition might be, for example, $CO_2$ and that identifier would correspond to the reference data with the spectral power distribution typically associated with $CO_2$ in the air. The processor 214, during the analysis, compares signals having a measured spectral power distribution to reference spectral power distributions in memory; and if there is a match, the processor 214 uses the corresponding composition identifier, such as $CO_2$, for event reporting or control operations. Based on results of the analysis of the stored data file and signals, may determine the presence of an environmental condition in the environment in which the device 102 is located. In response to the detected environmental condition, the controller 204 may output a report of the detected environmental condition. A report, for example, may be a list of values that correspond to an identifier of the detected substance. Or, the report may have one or more identifiers associated with one or more of a bacteria, a virus, smoke, carbon monoxide, carbon dioxide, natural gas, or the like. The list is not exhaustive but it is envisioned that the list of identifiers may include all substances detectable by the spectrometer 220. Alternatively, the report may simply list chemicals, contaminants or whatever substance the spectral reference data includes reference data to detect along with the specific substance that was detected, such as smoke or CO. Alternatively, the report may output detected values. For example, the data in the report, such as values, may be converted by the processor 214 to some meaningful scale, such as Parts Per Million (PPM) or the like, and the associated substance, e.g. smoke 100 PPM, CO 10 PPM, or the like. In yet another alternative, the report may be control signals that cause the lighting device to perform certain functions, such as, for example, the processor 214 may adjust a light output intensity of the light source 208 in response to a predetermined output report.

The device 102 may couple to a network, such as network 17 or 23 of FIG. 1, thought communication interface 212 which is connected for wired communication through the network terminal 207 or connected to transceiver 206 for wireless communication. For example, the controller 204 may receive via the communication interface 212 an spectral reference data file that updates the spectral reference data 219 currently stored in the non-volatile memory 218. More specifically, the device 102 equipped with the spectrometer 220 may be configured to detect smoke, in the case of fire, according to the spectral reference data 219 stored in the memory 218. The updated spectral reference data (not shown) may, for example, update the smoke reference data by also including carbon monoxide (CO) reference data in spectral reference data file. After the update of the spectral reference data, the spectrometer-equipped device 102 is able to output a detection result indicating that smoke and/or CO are present in the environment in the vicinity of the lighting device 102. Of course, more or less reference data may be included in the spectral reference data (SRD) file. For example, if the spectrometer-equipped device 102 is located in a hospital, the SRD file may contain reference data for smoke, CO, oxygen gas (02), MRSA, or other staph infections, blood or the like.

Other examples of configurations of devices and the control functions performed by a controller, such as 210, with respect to other examples of the spectrometer 220240 are explained in more detail below with reference to the examples of FIGS. 3A-10.

Figure 3A:
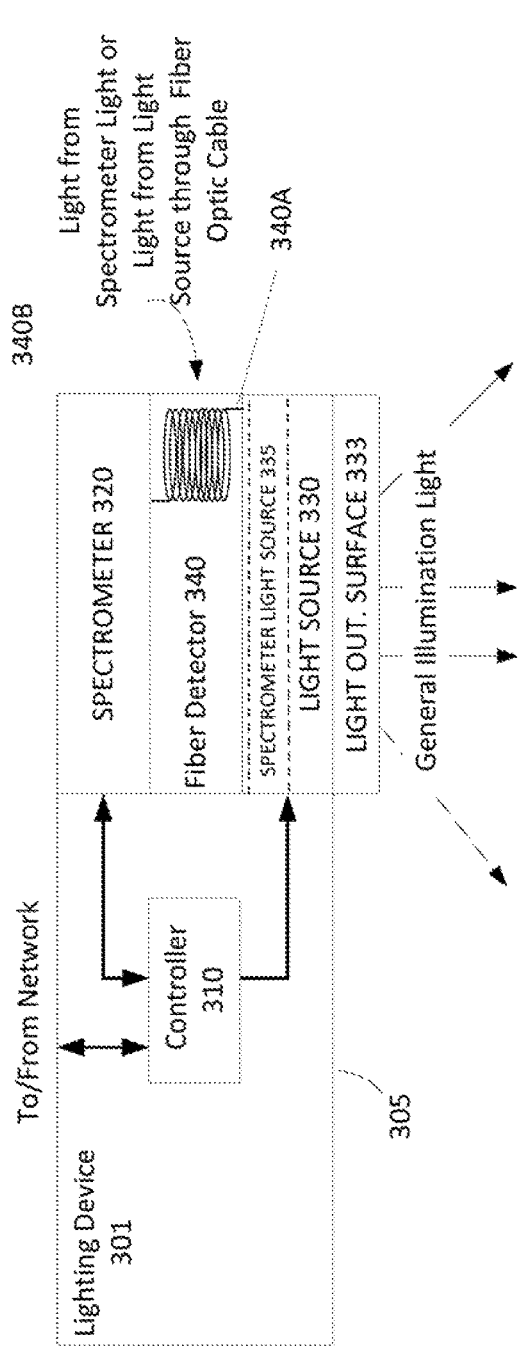
FIG. 3A illustrates in a functional block diagram an example of a lighting device that outputs artificial light and incorporates a fiber detector and a spectrometer.

FIG. 3A illustrates in a general functional block diagram of an example of a lighting device that outputs artificial light incorporating a fiber detector and a spectrometer as described herein. The lighting device 301 includes a housing 305, a controller 310, spectrometer 320, light source 330 and a fiber detector 340.

The spectrometer 320 is integrated within the device 301 via the housing 305 together with the light source via a fiber detector 340. Specifically, a first end 340A of the fiber detector 340 is optically coupled to the light source 330 as an input to receive light and a second end (opposite to the first end) 340B of the optical fiber cable 340 is optically coupled to the spectrometer 320 as an output to transmit light. In one implementation, the fiber detector 340 is optically coupled to the spectrometer 320 and the light source 330 via a fiber optic coupling connector (not shown). The spectrometer 320 is configured to receive or detect the outputted light and generate signals corresponding intensities of different wavelengths of the detected light. More specifically, a significant portion of the light travels in the cladding of the fiber detector 340 as an evanescent wave. Some of the evanescent wave of light surrounding exterior of the fiber detector 340 emanates from the portion of the fiber detector 240 that is exposed due to lack or removal of the cladding and interacts with the environment surrounding the exposed portion of the fiber detector 240. The spectrometer 320 is configured to measure the difference in the intensity of light at different wavelengths inputted at the first end 340A of the fiber detector 340 and the intensity of light outputted at the different wavelengths at the second end 340B of the fiber detector 340. In one implementation, the intensity of the light outputted at the second end 340B of the fiber detector 340 is lower than the intensity of the light inputted at the first end 340A of the fiber detector 340 in response to the evanescent wave's exposure to the environment surrounding the exposed portion of the fiber detector 340. Accordingly, as the light travels through the fiber detector 340, the interaction of the light of the evanescent wave with the environment surrounding the exposed portion of the fiber detector 340 diminishes the light intensity. The spectrometer 320 generates signals corresponding to spectral power distribution of the measured light at different wavelengths. The spectral power distribution of the measured light indicates the differences in the amount of radiant power emitted by the light source 208 and the amount of radiant power detected by the spectrometer 220 at different wavelengths.

The controller 310 includes a processor (not shown) coupled to the spectrometer 320 to process spectral power distribution measurements from the spectrometer 320 to selectively detect each of a plurality of different environmental conditions.

The housing 305 of the lighting device 301 may also optionally include a spectrometer light source 335. In configurations without the spectrometer light source 335, the light source 330 is configured to output light as general illumination light. General illumination light may be considered as light suitable for a user to perform a task, such as read a book, or to be able to identify objects within a room or space. General illumination may also be defined as a specific type of lighting suitable for a particular purpose, such as ultraviolet light, a grow light for plants, a specific spectral characteristic, such as color, wavelength, intensity or the like, of lighting specific to the area. For example, the lighting device 301 may be located in a zoological installation that provides lighting that mimics lighting conditions in a native habitat of an animal residing in the zoological installation.

The lighting device 301 may also include a light output surface 333. The light output surface 333 may, for example, be a diffuser that disperses the light passing through the fiber detector 340 and out of the lighting device 301.

The fiber detector 340 includes a first end 340A optically coupled to the light source 330 and a second end 340B optically coupled to the spectrometer 320. In one implementation, the exposed portion of fiber detector 340 is a space encompassing at least a portion of a medium, such as air, another gas, or a liquid, from the environment in which the lighting device 301 is located; and the spectrometer 320 is configured to receive light from substances within the medium. More particularly, the exposed portion of the fiber detector 340 is an illuminated space from which the spectrometer 320 detects spectral power distribution of light within the 3D space by the extent to which a beam of light in free space is detectable by the spectrometer 320 (such as the beams of light reflected or output from an object and received by the spectrometer) as shown in the examples of FIGS. 7-8. For example, a beam of light fills a volume of space in the exposed portion of the fiber detector 340. The housing 305 provides protection from the environment to the other components of the lighting device. For example, the housing keeps away dust, dirt, moisture and the like. In addition, the housing 305 secures the other components of the lighting device 300 in place and also may provide connection points or the like for installing the lighting device in a particular location.

The controller 310 may be configured as shown in the example of FIG. 2, but for ease of discussion and explanation not all of the details of the controller 204 of FIG. 2 are repeated in the following discussion of FIGS. 3A and 3B.

In the general example of FIG. 3A, the controller 310 is coupled to spectrometer 320 and the light source 330. The light source 330 is an artificial light generation device configured to generate illumination upon consumption of electrical power that is distinct from natural light provided by a skylight or other daylighting device, such as 55 of FIG. 1. The controller 310 may also be connected to an external network, such as network 17 of FIG. 1, via network connection 303. The controller 310 may receive spectral reference data and/or other data, and also output a report of the detected environmental condition via network connection 303. For example, the controller 310 provides control signals to the spectrometer 320 and light source 330.

Optionally or in addition, the lighting device 301 may also include a spectrometer light source 335. The spectrometer light source 335 is configured to illuminate the spectrometer 320 through the fiber detector 340 and outputs light having specific characteristics (e.g., infrared light, specific bandwidth light, such as only red or black light) as compared to the light output by the light source 330, which has to output light suitable for general illumination as explained above. Said differently, the spectrometer light source 335 emits light having known light emission characteristics that are detectable by the spectrometer 320. In instances when the lighting device is configured with only the light source 330, the light source 330 is configured to output light into the fiber detector 340 and output as general illumination light.

Whether or not the lighting device 301 includes the optional spectrometer light source 335, light is emitted into the fiber detector 340 for analyzing the spectral characteristics of any substances in the air surrounding the exposed portion of the fiber detector 340. The exposed portion of the fiber detector 340 contains air from the environment, such as a room, parking garage, hospital foyer, ceiling plenum, or the like, in which the lighting device 301 is located. Any airborne substances present in the air surrounding the exposed portion of the fiber detector 340, when illuminated with the light from the spectrometer light source 335 or light from the light source 330 may reflect or pass light that is detected by the spectrometer 320. In response to the detected light, the spectrometer 320 generates signals representative of the optical power intensity of the detected light. As described above with reference to FIG. 2, the controller 310 includes a memory, such as 216 and 218 and a processor 214. The controller 310 controls operation of the light source 330. The controller 310 also analyzes the signals generated by the spectrometer 320 in response to detecting light in relation to reference data stored in the memory to detect an environmental condition in the environment in which the lighting device 301 is located. For example, the controller 310 analyzes the received signal with respect to the spectral reference data to determine a chemical composition of the air in the exposed portion of the fiber detector. Based on the analysis, the controller may detect an environmental condition in the environment in which the device is located. In response to the detected environmental condition, the controller 16 may be configured to output via the communication interface 303 a report of the detected environmental condition.

The lighting device 301 may also include a light output surface 333. The light output surface 333 may, for example, be a diffuser that disperses the light passing through the fiber detector 340 and out of the lighting device 301.

Alternatively or in addition, the controller 310 in response to the output of the report of the detected environmental condition may be configured to perform, according to program instructions, a control function related to controlling the light source 330. The controller 310, or more specifically, the processor, such as 214 of FIG. 2, may, in response to a predetermined output report, adjust an output of the light source. For example, the controller 310 may be configured to react to analysis of signals generated by the spectrometer 320 in comparison to reference data that indicates the presence of an airborne bacteria. In which example, the controller 310 in response to the analysis indicating the presence of a particular substance, such as bacteria, supplies control signals to the light source 330 causing the light source 330, for example, to flash or blink.

Figure 3B:
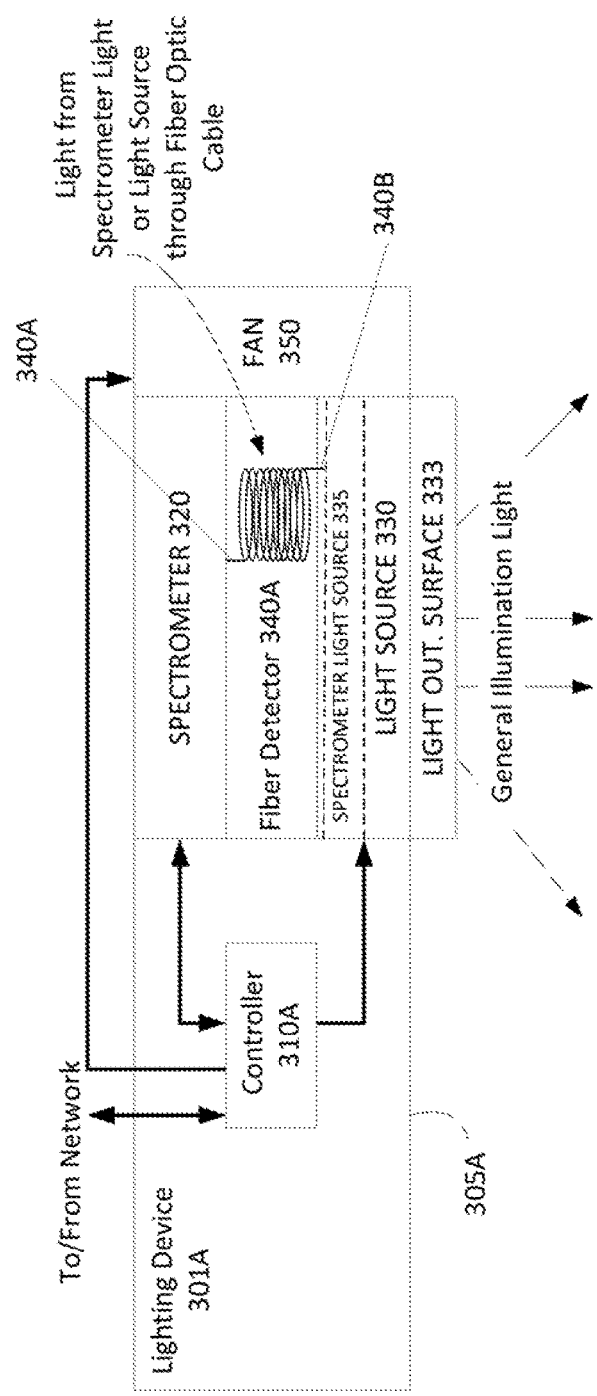
FIG. 3B illustrates in a functional block diagram of another example of a lighting device that outputs artificial light and incorporates a fiber detector and a spectrometer.

FIG. 3B illustrates in a functional block diagram of another example of a lighting device that outputs artificial light incorporating a fiber detector and a spectrometer as described herein. The lighting device 301A of FIG. 3B is similar to that of FIG. 3A. For example, the light source 330 is different from the lighting device 301 of FIG. 3A, the lighting device 301A of FIG. 3B includes a fan 350 positioned to enable transfer air between the spectrometer and the spectrometer light source. The fan 350 is configured to move the medium, in this case, air, from the environment in which the lighting device is located through the fiber detector 340. Due to the addition of the fan or blower 350, the housing 305A, and the controller 310A may have different and/or additional configurations and additional functions from the similar components shown in FIG. 3A.

For example, the housing 305A is configured to accommodate the addition of the fan 350. The exposed portion of the fiber detector 340 in FIG. 3B may include additional structure such as duct work, to receive air from the fan 350. As a result of the addition of the fan 350, the controller 310A is coupled to the fan 350, and outputs control signals to the fan 350 to cause the fan 350 to transfer air in the exposed portion of the fiber detector 340. A benefit of the fan 350 is that it provides a transfer of a greater volume of air through the exposed portion of the fiber detector 340 and as a result a greater probability of detecting substances in the air in the environment in which the lighting device is located. Otherwise, the functions of the spectrometer 330, optional spectrometer light source 335, light source 330 as well as the controller 310A are substantially the same as those described with reference to FIGS. 3A and 2 above. For example, the light source 330 and/or spectrometer light source 335, spectrometer 320 control and the analysis of the spectrometer 320 output by the controller 310A in FIG. 3B are the same as that in described above with reference to FIGS. 3A and 2 above. Although, as illustrated in FIG. 3B, fan 350 is utilized to provide forced air, it is known to one skilled in the art that other types of forced air systems such as an air jet, or an air furnace may be utilized or even passive air flow system may be utilized to provide forced air. Such examples are just a few common forced air systems, it is known to one of ordinary skill in the art that there may be many other various types of forced air systems that may be utilized to provide forced air. In an additional example, the exposed portion of the fiber detector 340 may be filled with a gas or particulate medium. In a still further example the exposed portion of the fiber detector 340 may extend to or encompass a surface treatment, such as litmus paper, in addition to air or liquid; and the surface treatment functions as a form of catalyst or as a reaction agent for analysis of the medium for a particular substance. For example, the spectrometer 320 may detect a change in spectral characteristics of the surface treatment as the surface treatment reacts to a substance in the air in the exposed portion of the fiber detector 340. In one implementation, liquids, air permeable polymer gases or other types of medium on one or more exposed portions of the fiber detector 340 change the absorption of the fiber detector 340 such that the optical power is converted into heat. In one example, change in the absorption property of the fiber detector 340 is due to a chemical reaction caused by a mixture of the medium with the surface treatment on exposed portion of the fiber detector.

In the example of FIG. 1, a device was described with respect to skylight 55. Such a device may not include a light source or a spectrometer light source that provides artificial light because natural light is provided through the skylight 55. The skylight 55 may also be a type of daylighting device, such as a light tube, that receives natural light from an exterior of a premises and delivers light to the interior space of the premises as general illumination light or as additional lighting for the interior space.

Figure 4:
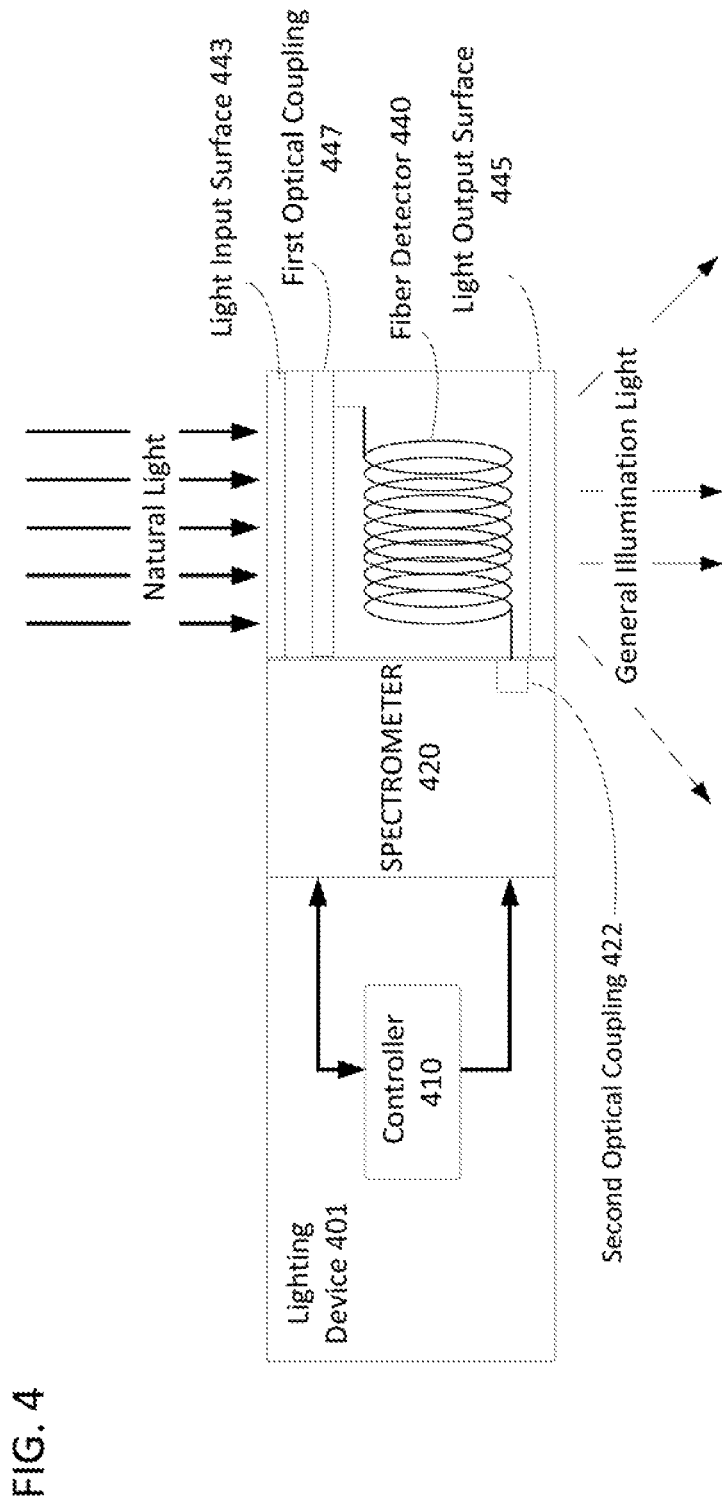
FIG. 4 illustrates in a functional block diagram of an example of a device that provides general illumination and incorporates a fiber detector and a spectrometer.

FIG. 4 illustrates in a functional block diagram of an example of a lighting device (device) 401 that provides general illumination using natural light incorporating a fiber detector and a spectrometer as described herein. The device 401 includes a controller 410, a spectrometer 420 and a fiber detector 440. The fiber detector 440 may have a light input surface 443 opposite a light output surface 445. The fiber detector 440 receives natural light through the light input surface 443, and outputs light into an environment, such as an area or space, such as 13. The light input surface 443 may be a lens that directs natural light from outside the device 401 incident on the light input surface 443 into the fiber detector 440 via a first optical coupling 447. In one implementation, the first optical coupling 447 is an optical coupling that is configured to expose light to one end of the fiber detector 440. Conversely, the light output surface 445 may be a diffuser that disperses the natural light passing through the fiber detector 440 and out of the light output surface 445. The device 401 may optionally include a second optical coupling 422 configured to couple the fiber detector 440 to the spectrometer 420 enabling the spectrometer 420 to receive the light from the fiber detector 440. In one implementation, the second optical coupling 422 is an optical coupling that exposes the light from other end (opposite to the one end) of fiber detector 440 to the spectrometer 420.

Similar to the functions performed by the controller, the spectrometer and a fiber detector of FIGS. 1-3B as described above, the controller 410, the spectrometer 420 and a fiber detector 440 perform similar functions and output similar results. A reader should refer to the above descriptions of these elements for details of the similar function as such details will not be repeated for ease of discussion.

Figure 5:
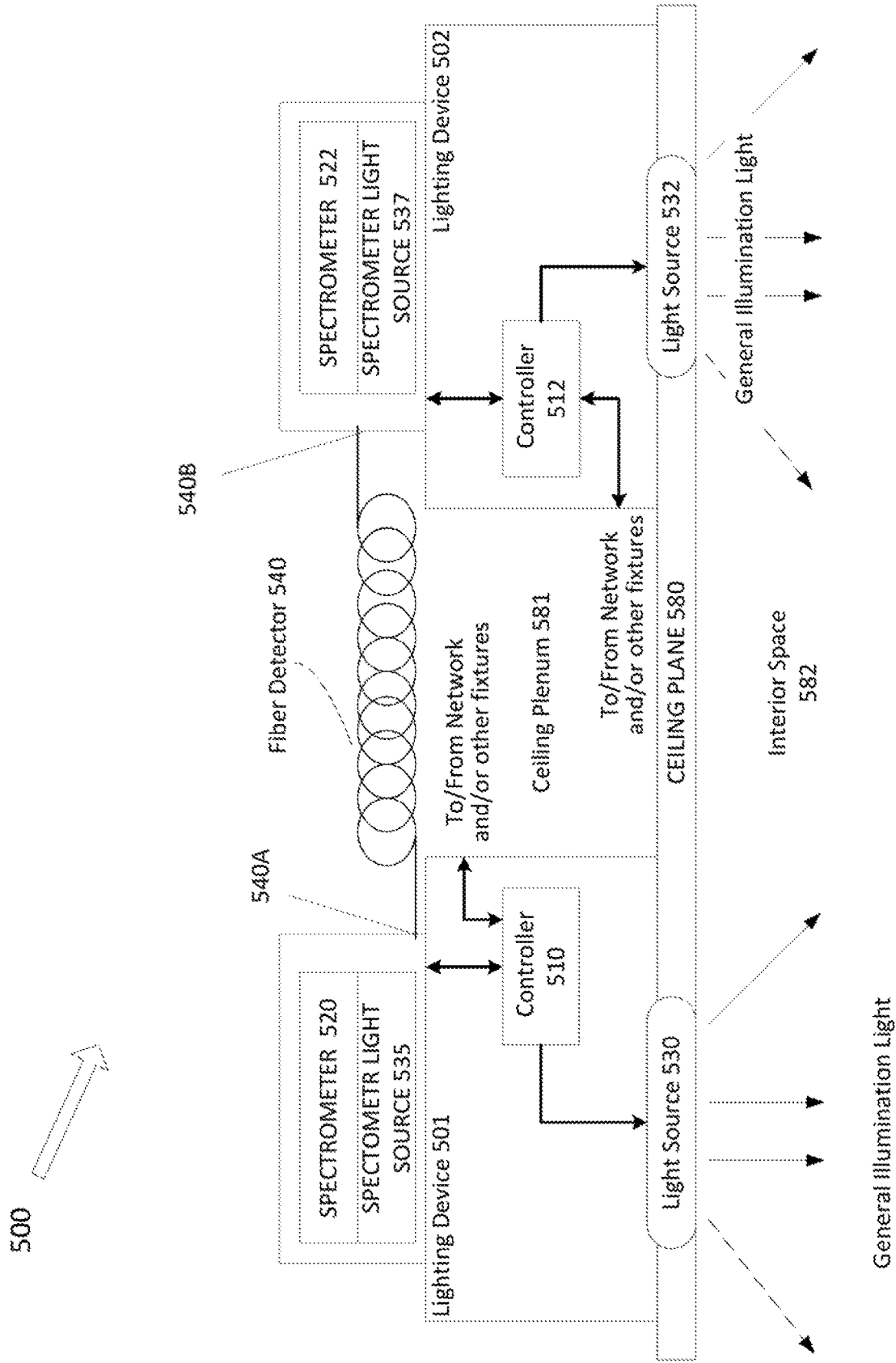
FIG. 5 illustrates an example of an implementation of a number of lighting devices operating in cooperation with one another to analyze the common environment in which the number of lighting devices with a fiber detector and one or more spectrometers are located.

FIG. 5 illustrates an example of an implementation of a number of lighting devices shown in functional block diagrams of a system 500 operating in cooperation with one another to analyze the common environment in which the number of lighting devices are located as described herein.

The system 500 of a first lighting device 501 and a second lighting device 502 operate in cooperation with one another to provide an analysis of the common environment in the vicinity of the lighting devices 501 and 502. The lighting devices 501 and 502 are located in the ceiling plane 580 in order to provide general illumination lighting to the interior space below the ceiling plane 580. In the example of FIG. 5, the system 500 is configured to analyze the environmental conditions of a ceiling plenum, and may be coupled to external devices via a communication network, such as 17 or 23 of FIG. 1, for example. The lighting devices 501 and 502 are similarly configured, and as a result, reference to the environmental analysis will be made with reference to lighting device 501, but a similar discussion may be applicable to lighting device 502. In the example of FIG. 5, the lighting device 501 includes a controller 510, a spectrometer 520 with a spectrometer light source 535, a light source 530 and the spectrometer 520 is. Similarly, the lighting device 502 includes a controller 512, a spectrometer 522 with a spectrometer light source 537, a light source 532 and the spectrometer 522. The system 500 further includes a fiber detector 540 having a first end 540A and a second end 540B. In one implementation, the first end 540A is optically coupled to the spectrometer light source 535 and the second end 540B is optically coupled to the spectrometer 522. In another implementation, the first end 540A is optically coupled to the spectrometer 520 and the second end 540B is optically coupled to the spectrometer light source 537. Although, not shown, the system 500 may include two fiber detectors, with one fiber detector coupled between the spectrometer 520 and the spectrometer light source 537 and another fiber detector coupled between the spectrometer 522 and the spectrometer light source 535.

The alignment of the respective lighting devices 501 and 502 is such that light emitted by the respective spectrometer light sources 535 and 537 is directed toward the respective spectrometer 522 and spectrometer 520. For example, the fiber detector 540 is configured to direct light from a spectrometer light source either 535 or 537 in the ceiling plenum toward the opposite spectrometer 522 or 520, respectively, for detection. As described above, light travels through a bare area at an exterior portion of the fiber detector 520, the light interacts with a surrounding environment in which the bare area of the fiber detector is exposed. As described above, the interacted light is detected by the spectrometer 522 or 520, which, in response to the detected interacted light, generate signals representing a spectral power distribution of the interacted light. Similar to the controller 204 in lighting device 102 of FIG. 2, the controller 510 of lighting device 501 is coupled to the light source 530, the spectrometer 520 and the spectrometer light source 535. The controller 510 controls the respective components in a manner similar to that described with reference to FIG. 2. However, since the devices 501 and 502 operate in cooperation with one another, there are differences that may be best explained with reference to an example.

In an example, the controllers 510 and 512 may be configured to communicate with one another via a wired or wireless communication link, such as through a wireless transceiver or the like. For example, the controllers 510 and 512 may coordinate the ON/OFF times of the respective spectrometer lights 535 and 537.

The spectrometer light sources 535 and 537 may be configured to output light having known spectral characteristics. The known spectral characteristics may be the same for each of spectrometer light sources 535 and 537. For example, both spectrometer light sources 535 and 537 may output light in a same wavelength, such as a narrow wavelength of visible light, or infrared light. Alternatively, spectrometer light source 535 may output light in the visible wavelengths, while spectrometer light source 537 may output light in a portion of the infrared wavelengths. By having spectrometer light sources 535 and 537 in the devices 501 and 502 respectively emit light of different wavelengths, the to receive the light output by the spectrometer light source 535 of the first lighting device 501. The spectrometer 522 of the lighting device 502 may be configured to detect light emitted by the spectrometer light source 535. For example, the spectrometer 522 may include specific spectral filters corresponding to the wavelengths of the light emitted by the spectrometer light source 535. The spectrometer 522 of device 502 detects the light emitted by the spectrometer light source 535. In response the detected light, the spectrometer 522 generates signals in manner similar to that as described above with reference to the example of FIG. 2, that are provided to controller 512. In one implementation, the spectrometer light sources 535 and 537 output light one at time. In one implementation, each of the spectrometers 520 and 522 function to detect light and generate signals one at a time. In another implementation, both the spectrometer light sources 535 and 537 output light at the same time. In another implementation, both the spectrometers 520 and 522 function to detect light and generate signals at the same time. Similar to the controller 204 of FIG. 2, a processor in controller 512 generates a system 500 is able to detect the presence of a greater number of substances in the air and/or surfaces of the ceiling plenum 581. The ceiling plenum 581 is bounded by ceiling plane 580 and the bottom of the floor or roof of the space in which the devices 501 and 502 are located. In addition, the devices 501 and 502 may cooperate to calibrate their respective spectrometers 520 and 522 and/or their respective spectrometer light sources 535 and 537. For example, since the characteristics of the light emitted by the respective spectrometer light sources 535 and 537 are known, the respective controllers 510 and 512 may use signals received from their respective spectrometers 520 and 522 to calibrate their respective spectrometers by noting differences from the known characteristics of the light emitted from the respective spectrometer light sources 535 and 537. As such, the reference data is updated based on these differences in the light characteristics of the light emitted from the respective spectrometer light sources 535 and 537. In one implementation, each of the spectrometers 520 and 522 would communicate the updated reference data with one another. In one example, the difference may occur due to aging of the spectrometer light sources 535 and/or 537. In another example, the difference may occur due to change in light characteristics in an indoor environment due to change in light such as natural light being received from outside the indoor environment. Alternatively or in addition, the respective devices 501 and 502 may exchange data related to the received light to enable calibration of the respective spectrometer light source 535 or 537 and/or the respective spectrometers 520 or 522.

The controller 510 may be configured to control the spectrometer light source 535 to output light into the ceiling plenum (i.e., the space above the ceiling plane 580). The spectrometer 522 of the second lighting device 502 is aligned report based on an analysis of the signals generated by the spectrometer 522. The controller 512 may output the report to an external device coupled to a communication network for evaluation and/or other actions.

The controller 512 of device 502 may be configured to cause the spectrometer light source 537 to emit light that is output toward the spectrometer 520. As mentioned above, the spectrometer light source 537 may output light in a different wavelength than spectrometer light source 535. Since the lighting devices 501 and 502 are cooperating as part of system 500, the spectrometer 520 may detect the light emitted by the spectrometer light source 537, and generate detection signals as described above with reference to FIG. 2. As such, the controller 510 may perform an analysis of the generated detection signals and provide a report. The report may be transmitted to an external device on a communication network. Alternatively, the respective controllers 510 and 512 may be configured to output their respective detection reports to one another. In response to the detection report indicating an unsafe environmental condition, e.g., smoke or unsafe levels of CO, the controller detecting the unsafe environmental condition may transmit the detection report or an indication of the unsafe condition to the other controller. As a result of the shared unsafe environmental condition, both controllers 510 and 512 may output control signals to their respective light sources 530 and 532 causing the respective light sources to emit flashes of light or blinking that indicates the existence of an unsafe environmental condition to occupants of the interior space 582. In one implementation, the light sources 530 and 532 emit general illumination light of essentially the same wavelength range. In one implementation, the light sources 530 and 532 emit general illumination light of different spectral characteristics, e.g. having at least some different wavelengths. In one implementation, the light sources 530 and 532 emit general illumination light of wavelengths suitable for general lighting but different from (e.g. not including) wavelengths of the light emitted by the spectrometer light sources 535 and 537. In one example, the wavelength is in the range of 400 nm to 700 nm. In another example, the wavelength is in the range 1 microns to 6 microns. In a further example, the wavelength is in the range of 8-12 microns.

In one implementation, the system 500 functions as a fluorometer, which is a device that is used to measure the intensity of the fluorescence. In one example, the spectrometer 522 includes monochromators (prism or grating) corresponding to the wavelengths (narrow) of the fluorescence emitted by the spectrometer light source 535. A monochromator is a an optical device that transmits selectable narrow band of wavelengths of light or other radiation chosen from a wider range of wavelengths available at the input. The spectrometer 522 detects the fluorescence emitted by the spectrometer light source 535, which is passed through the fiber detector 540 to examine a bacteria that would interact with the evanescent wave of the fluorescence. As such, the spectral characteristics such as the intensity of the fluorescence would diminish as it reaches the spectrometer 522. In one implementation, the spectrometer 522 generates signals corresponding to spectral power distribution of the measured fluorescence at narrow wavelengths. In another example, the spectrometer 520 includes monochromators corresponding to the wavelengths (narrow) of the fluorescence emitted by the spectrometer light source 537. In a further example, both the spectrometers 520 and 522 include monochromators.

Figure 6:
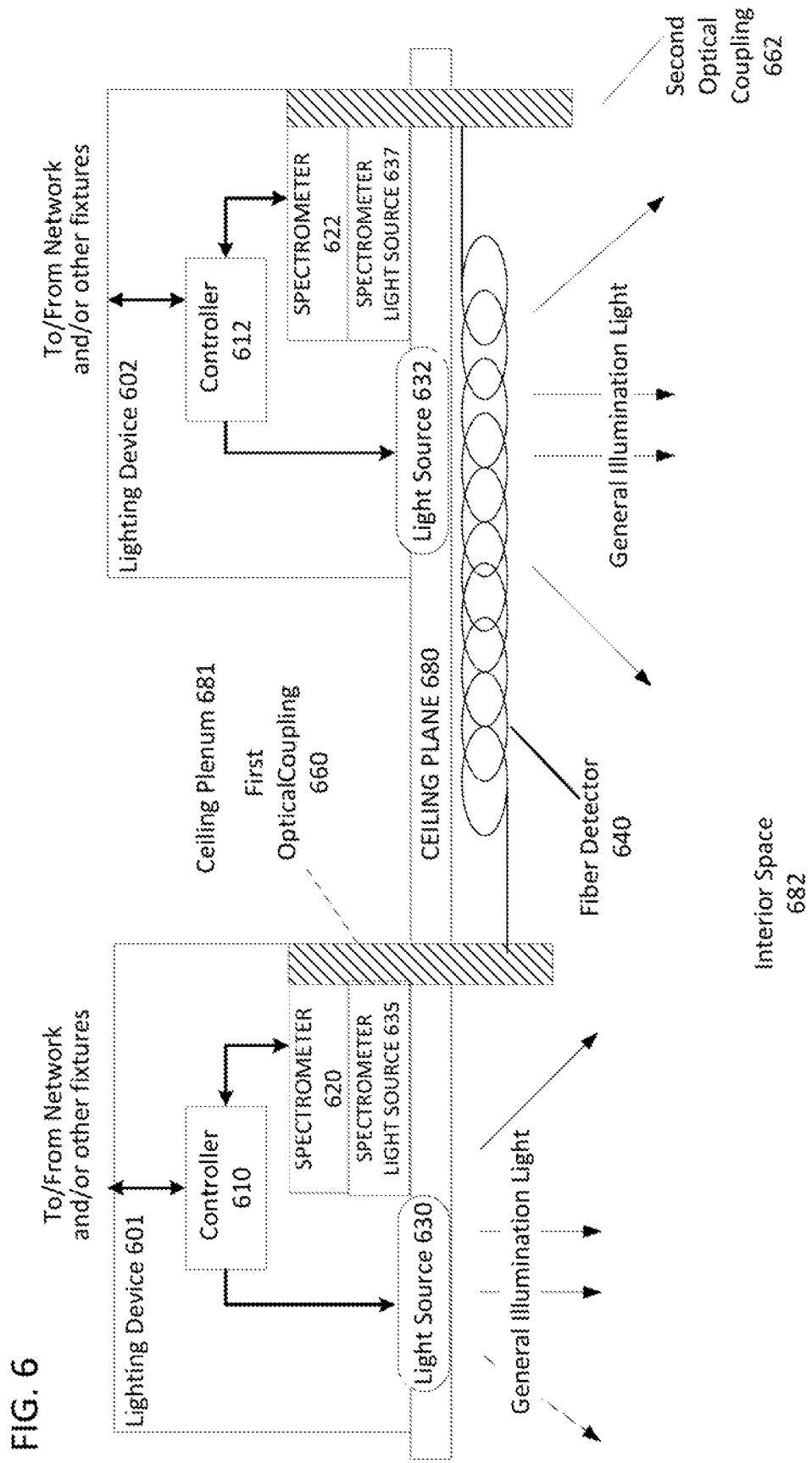
FIG. 6 illustrates another example of an implementation of a number of lighting devices with a fiber detector and spectrometers operating in cooperation with one another.

FIG. 6 illustrates another example of an implementation of a number of lighting devices operating in cooperation with one another as described herein. The system 600 includes devices 601 and 602 operate in cooperation with one another to detect an environmental condition with respect to the occupiable space 682. Device 601 includes controller 610, spectrometer 620, light source 630, spectrometer light source 635 and a first optical coupling 660. Similarly, the device 602 includes controller 612 spectrometer 622, light source 632, spectrometer light source 637 and a second optical coupling 662. As shown, the system 600 example of FIG. 6 is similar to the example of FIG. 5 except instead of detecting the environmental condition of the ceiling plenum, the example of FIG. 6 detects the environmental condition of the interior space in the vicinity of the first device 601 and second device 602. The respective controllers 610 and 612 of FIG. 6 operate in a manner similar to the other controllers described in the prior examples of FIG. 5.

In the example of FIG. 6, the devices 601 and 602 are substantially similar to those of FIG. 5 except the respective first and second optical couplings 660 and 662 that is coupled to the respective spectrometer 620 and 622 passes through the ceiling plane 680 into the occupiable space 682 in the vicinity of the environment in which the respective devices 601 and 602 are located. The system 600 further includes a fiber detector 640 having a first end 640A and a second end 640B. Similar to discussion with respect to FIG. 5, in one implementation, the first end 640A is optically coupled to the spectrometer light source 635 and the second end 640B is optically coupled to the spectrometer 622. In another implementation, the first end 640A is optically coupled to the spectrometer 620 and the second end 640B is optically coupled to the spectrometer light source 637. The fiber detector 640 functions similar to the fiber detector 540 discussed with respect to FIG. 5.

Other examples of a single device operating within an environment are also envisioned. For example, the examples of FIGS. 7-8 may be located in hospitals, food service areas, parking garages, residential areas or the like.

FIG. 7 illustrates an example of an implementation of a lighting device implemented to analyze the air or an object in the environment in which the lighting device is located as described herein. The example of FIG. 7 provides a device envisioned to be mountable in nearly any location, indoors or outdoors, that would benefit from environmental condition analysis. In the illustrated configuration, the lighting device 701 includes a housing 705, a controller 710, a spectrometer 720, a light source 730, a spectrometer light source 735, and a fiber detector 740. The controller 710 may be configured substantially as described above with reference to FIG. 2. As such, the controller 710 is coupled to the spectrometer 720, the light source 730, the spectrometer light source 735, and a communication network, such as 17 or 23 of FIG. 1.

In the example shown in FIG. 7, the lighting device 701 is positioned near the ceiling plane 780 with the housing 705 above the ceiling plane with substantial portion of the device 701 being located in the ceiling plenum 781. In one implementation, the functions of the fiber detector 740 are similar to the fiber detector 240 of FIG. 2.

In one implementation, the controller 710 controls the light source 730, the spectrometer 720 and the spectrometer light source 735. In the example of FIG. 7, since the spectrometer 720 and spectrometer light source 735 share the fiber detector 740, the controller 710 may be configured to alternately output control signals causing the spectrometer light source 735 to emit light through the fiber detector 740 and output other control signals to the spectrometer 720 to receive reflected light. The detection and analysis functions of the controller 710 are performed similar to the detection and analysis functions of controller 204 described above with reference to FIG. 2. In addition, the controller 710 performs an analysis of the detection signals generated by the spectrometer 720, and outputs a report in a manner similar to the same functions performed by the controller 204. Based on the results of the analysis, the controller 710 may send a report to another device and/or to a remote device coupled to a communication network.

FIG. 8 illustrates another example of an implementation of a lighting device implemented to analyze the air or an object in the environment in which the lighting device is located as described herein. In the illustrated configuration, the device 801 includes a housing 805, a controller 810, a spectrometer 820, a light source 830, a spectrometer light source 835, and fiber detector 840. In one implementation, the functions of the fiber detector 740 are similar to the fiber detector 240 of FIG. 2. The controller 810 may be configured substantially as described above with reference to FIG. 2. As such, the controller 810 is coupled to the spectrometer 820, the light source 830, the spectrometer light source 835, and a communication network, such as 17 or 23 of FIG. 1.

In the example shown in FIG. 8, the device 801 may include a housing 805 that is configured to be mounted or connected to a surface, such as a wall, a post, a light pole, a ceiling or the like, that is referred to as the mounting plane 890.

The operation of the device 801 and the functions performed by the respective components of the device 801 operate in the same manner as the operations and functions described above with respect to FIGS. 2 and 7 above. Although the fiber detector in FIGS. 2-8 is illustrated in a loop of coil of fiber, one of ordinary skill in the art would appreciate that the fiber detector may be a straight fiber coil.

FIGS. 9A-9F illustrate in a general functional block diagram of examples of various shapes of fiber detectors and positioning of the fiber detectors with respect to a lighting device as described herein.

FIGS. 9A and 9B illustrates examples of a fiber detector 940A and a fiber detector 940B in which each respectively resembles a sphere. FIG. 9A illustrates an example of a fiber detector 940A positioned inside a lighting device 901 and rest of the portion of the fiber detector 940A is positioned outside the lighting device 901. As such, only some portion of the fiber detector 940A is optically coupled to components such as a spectrometer (not shown) and a light source (not shown) inside the lighting device 901. FIG. 9B illustrates an example of a fiber detector 940B tangential to the lighting device 901 such that only a surface of a fiber detector 940B is positioned to be optically coupled to components (not shown) of the lighting device 901. As such, the fiber detector 940B is hanging outside the lighting device 901. As discussed above, the fiber detector is optically coupled to the components of the lighting device via a fiber optic coupling connector (not shown). In one implementation, the fiber detectors 940A and/or 940B are a loop of coil of fiber. In another implementation, the fiber detectors 940A and/or 940B are a straight fiber coil.

FIGS. 9C and 9D illustrates examples of a fiber detector 940C and a fiber detector 940D respectively both shaped as a rectangle. Fiber detector 940C is positioned similar to the fiber detector 940A with respect to the lighting device 901 as described and illustrated in FIG. 9A. Fiber detector 940D is positioned similar to the fiber detector 940B with respect to the lighting device 901 as described and illustrated in FIG. 9B. In one implementation, the FIGS. 9E and 9F illustrates examples of a fiber detector 940E and a fiber detector 940F respectively resemble a polygon. Fiber detector 940E is positioned similar to the fiber detector 940A with respect to the lighting device 901 as described and illustrated in FIG. 9A. Fiber detector 940F is positioned similar to the fiber detector 940B with respect to the lighting device 901 as described and illustrated in FIG. 9B.

In one implementation, fiber detectors 940A-940E of FIGS. 9A-9F are optical fiber cables. As discussed above, an optical fiber cable is made up of a single thread or multiple threads of glass or plastic known as optical fibers such that one cable can have as few as one thread or as many as several hundred threads, each of which is capable of transmitting data modulated into light waves. Although, the fiber detectors 940A-940E are illustrated to be shaped as circular, rectangular and a polygon, one of ordinary skill in the art would appreciate that fiber detector may have other cross-sectional shapes. In one implementation, the fiber detectors 940A-940E are optical waveguides (waveguides). A waveguide is a physical structure that guides electromagnetic waves in the optical spectrum. Common types of optical waveguides include optical fiber and rectangular waveguides, which functions similar to an optical fiber cable.

Figure 10:
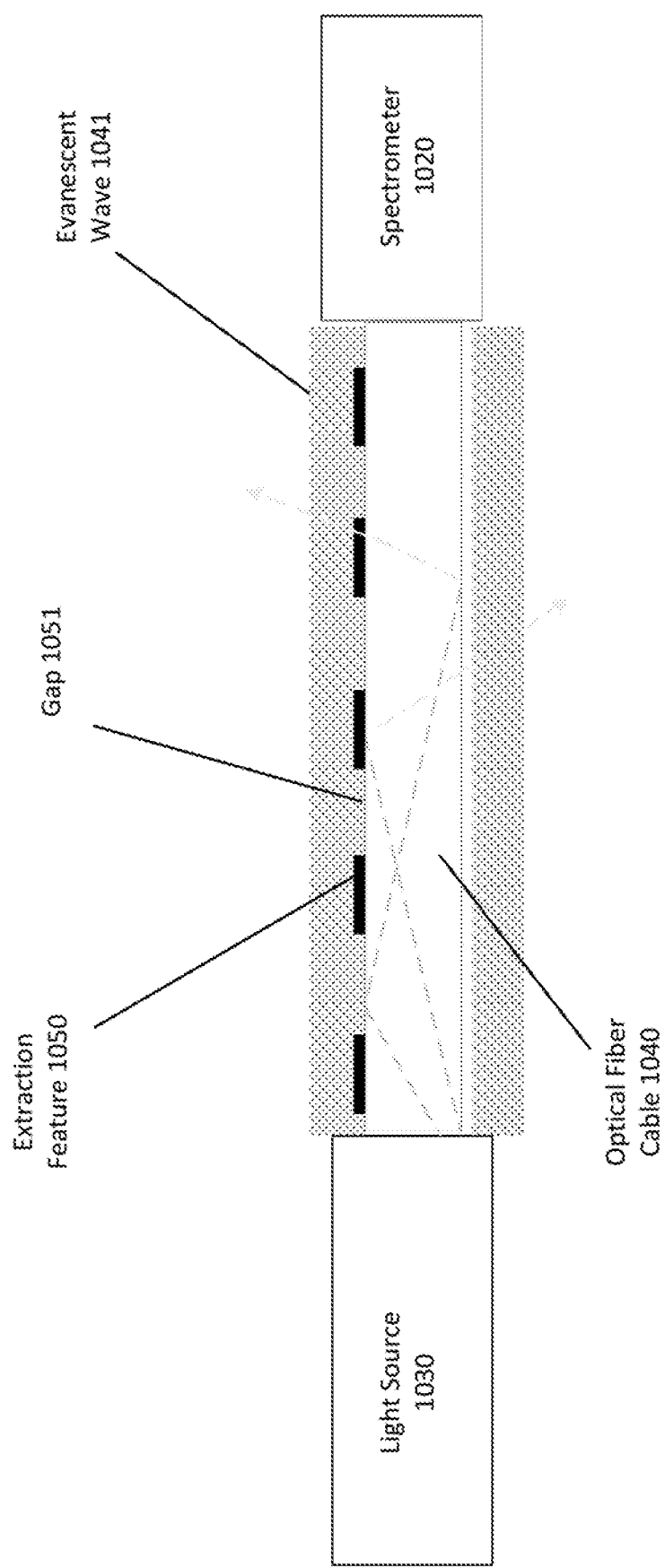
FIG. 10 is a functional block diagram of an example of an implementation of a lighting device implemented with an optical fiber cable and spectrometer in which the lighting device is located.

FIG. 10 illustrates in a functional block diagram of an example of an implementation of a lighting device incorporating a spectrometer 1020 and an optical fiber cable 1040 as described herein. The optical fiber cable 1040 is optically coupled to a light source 1030 at one end to receive light and also optically coupled to the spectrometer 1020 at the other end to output light. As discussed above, a significant portion of the light travels in the cladding of the optical fiber cable 1040 as an evanescent wave 1041. Also, as discussed above, some of the evanescent wave 1041 surrounding an exterior of the optical fiber cable 1040 emanates from a bare area or an exposed portion of the optical fiber cable 1040 and interacts with the environment surrounding the exposed portion of the optical fiber cable 1040. As discussed above with reference to the examples of FIGS. 1-9, the interacted light is the light output from the light source 1030 that has been affected by interaction with the environment surrounding the optical fiber cable 1040, and that is subsequently detected by the spectrometer 1020. As discussed above with reference to the other examples, the spectrometer 1020 functions to generate signals representing a spectral distribution of the detected light. The interaction of the evanescent wave of the outputted light with the environment may diminish spectral characteristics of the light.

Extraction features 1050 in or associated with the optical fiber cable 1040 may be aligned with gaps 1051 throughout an outer surface of the optical fiber cable 1040, although the extraction features 1050 may not fully cover the respective gaps 1051. The extraction features 1050 may take the form of a treatment or a structure formed at the outer surface of the optical fiber cable 1040. Although FIG. 10 illustrates the extraction features 1050 to be present only on one side of the outer surface of the optical fiber cable 1040, one of ordinary skill in the art would appreciate that the extraction features 1050 may be present on both sides of the outer surface of the optical fiber cable 1040. Also, FIG. 10 illustrates the extraction features 1050 as aligned throughout the outer surface of the optical fiber cable 1040, it is known to one of ordinary skilled in the art that one or more extraction features may be unaligned at the outer surface of the optical fiber cable 1040. The extraction features 1050 could be light scattering portions of the optical fiber cable 1040 that function as reflectors that interfere with the evanescent wave 1041 and allow the light to exit from the optical fiber cable 1040 to provide general illumination in the surrounding area. As such, the light intensity or optical power of the light may further diminish when received at the spectrometer 1020 due to the extraction features 1050. In one implementation, the extraction features cause such as light intensity to further diminish between one to ten percent. In one implementation, the extraction features are not exposed to the impurities in the environment, thus not causing any further diminish of the light intensity of the light. In one implementation, the amount of light exiting the optical fiber cable 1040 as general illumination is consistent throughout the optical fiber cable 1040.

Figure 11:
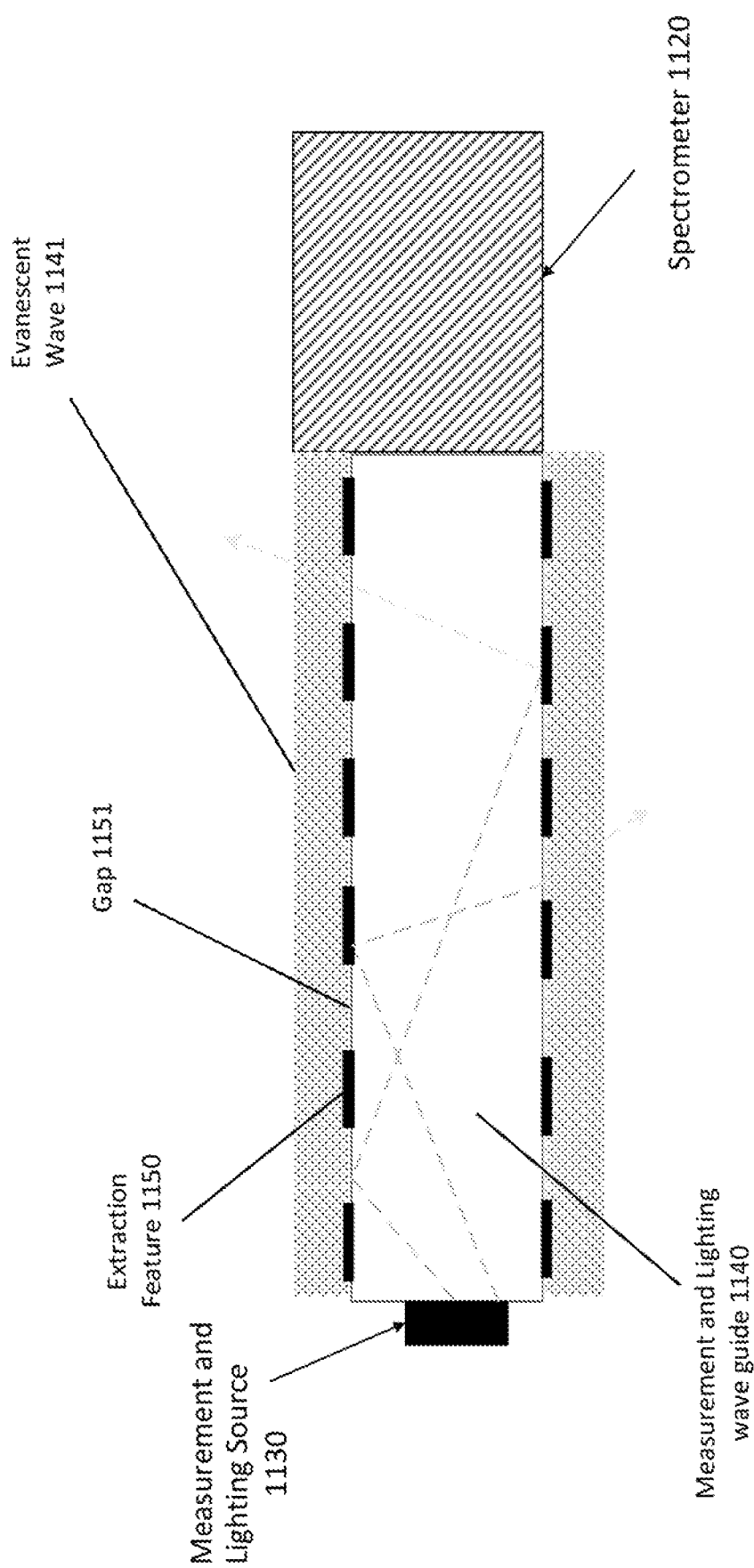
FIG. 11 is a functional block diagram of an example of an implementation of a lighting device implemented with a waveguide and a spectrometer in which the lighting device is located.

FIG. 11 illustrates in a functional block diagram of an example of an implementation of a lighting device incorporating a spectrometer 1120 and a waveguide 1140 as described herein. The waveguide 1140 functions similar to the optical fiber cable 1040 as discussed above. The waveguide 1140 is optically coupled to a light source 1130 at its one end to receive light and also optically coupled to the spectrometer 1120 at the other end to output light. As discussed above, a significant portion of the light travels in the cladding of the waveguide 1140 as an evanescent wave 1141. Also, as discussed above, some of the evanescent wave 1141 surrounding an exterior of the waveguide 1140 emanates from a bare area or an exposed portion of the waveguide 1140 and interacts with the environment surrounding the exposed portion of the waveguide 1140. As discussed above, the light intensity is lower when received at the spectrometer 1120 as compared to when the light enters the waveguide 1140 via the light source 1130. In one implementation, the light source 1130 functions as a measurement light source as well as lighting source such that the light source 1130 measures the light intensity entering the waveguide 1140. In one implementation, the waveguide 1140 functions as a measurement wave guided along with the lighting wave guided such that the waveguide 1140 measures the light intensity as the light travels throughout the wave guide 1140 and before it is detected by the spectrometer 1120.

Extraction features 1150 in or associated with the waveguide 1140 are aligned with gaps 1151 throughout an outer surface of the waveguide 1140, although the extraction features 1150 may not fully cover the respective gaps 1151. The extraction features 1150 may take the form of treatment or structure formed at the surface of the waveguide 1140. Although FIG. 11 illustrates the extraction features 1150 to be present on both sides of the outer surface of the waveguide 1140, one of ordinary skill in the art would appreciate that the extraction features 1150 may be present only one side of the outer surface of the waveguide 1140. Also, FIG. 11 illustrates the extraction features 1150 as aligned throughout the outer surface of the optical fiber waveguide 1140, it is known to one of ordinary skill in the art that one or more extraction features may be unaligned at the outer surface of the waveguide 1140. Although not shown, in one implementation, the extraction features may be in the volume of the waveguide. 1140. Extraction features could be frit produced by etching or the like, prismatic features, lens structures formed in or coupled to the surface, etc. formed in or located in an appropriate pattern along regions of the outer surface of the waveguide 1140. The extraction features 1150 could be light scattering portions of the waveguide 1140 that function as a reflectors that interfere with the evanescent wave 1141 and allow the light to exit from the waveguide 1140 to provide general illumination in the surrounding area. As discussed above, the spectral characteristics of the light as detected at the spectrometer 1120 are further diminished due to the extraction features 1150. In one implementation, the amount of light exiting as general illumination is consistent throughout the waveguide 1140.

Aspects of methods of detecting spectral illumination data and analyzing the spectral illumination data by the devices described in FIGS. 1-10 outlined above may be embodied in programming, e.g. in the form of software, firmware, or microcode executable by a portable handheld device, a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into platform such as one of the controllers of FIGS. 2-10. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible or non-transitory storage medium, a carrier wave medium or physical transmission medium. Non-volatile storage media include, for example, optical or magnetic disks, such as any of the storage hardware in any computer(s), portable user devices or the like, such as may be used to implement the server computer 29, the personal computer 27, the mobile device 25 or controllers 102, 204, etc. shown in the drawings. Volatile storage media include dynamic memory, such as main memory of such a computer or other hardware platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge (the preceding computer-readable media being "non-transitory" and "tangible" storage media), a carrier wave transporting data or instructions, cables or links transporting such a carrier wave, or any other medium from which a computer can read programming code and/or data. Many of these forms of computer readable media may be involved in carrying data and/or one or more sequences of one or more instructions to a processor for execution.

Program instructions may comprise a software or firmware implementation encoded in any desired language. Programming instructions, when embodied in a machine readable medium accessible to a processor of a computer system or device, render a computer system or a device into a special-purpose machine that is customized to perform the operations specified in the program instructions.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    a first lighting device comprising:
        a first light source integrated within the first lighting device configured to emit general illumination light into an environment of space to be illuminated by the first lighting device;
        a spectrometer and a spectrometer light source integrated within the first lighting device; and
        a first processor coupled to output control signals to the spectrometer light source of the first lighting device causing the spectrometer light source to output light in a predetermined direction; and
    a second lighting device, comprising:
        a second light source integrated within the second lighting device configured to emit general illumination light into the environment in space to be illuminated by the second lighting device;
        a spectrometer and a spectrometer light source integrated within the second lighting device; and
        a second processor coupled to the spectrometer of the second lighting device to process spectral power distribution measurements from the spectrometer to selectively detect a plurality of different environmental conditions in the environment in which the second lighting device is located,
        wherein the spectrometer of the second lighting device is aligned to receive a portion of the light output by the spectrometer light source of the first lighting device and the spectrometer of the first lighting device is aligned to receive a portion of the light output by the spectrometer light source of the second lighting device; and
    a fiber detector comprising:
        a first end optically coupled to the spectrometer of the first lighting device;
        a second end optically coupled to the spectrometer of the second lighting device; and
        a bare area exposed to air in the environment between the first and second ends of the fiber detector, wherein:
        light emitted by the spectrometer light source of the first lighting device is directed through the fiber detector toward the spectrometer of the second lighting device, and light emitted by the spectrometer light source of the second lighting device is directed through the fiber detector toward the spectrometer of the first lighting device,
        the light output of the spectrometer light source of the first lighting device is a different wavelength than the light output of the spectrometer light source of the second lighting device, and
        the bare area of the fiber detector permits an evanescent light wave surrounding an exterior of the fiber detector to interact with the air in the environment in which the bare area of the fiber detector is exposed, wherein the first lighting device and the second lighting device collectively operate to provide an analysis of the environment common to the first and second lighting device, and wherein an output of the light source of the respective first and second lighting devices is controlled in accordance with the analysis of the environment.

2. The system of claim 1, wherein at least part of the bare area of the fiber detector optically coupled to the first and second lighting devices is located in a ceiling plenum.

3. The system of claim 1, wherein the fiber detector is an optical fiber cable.

4. The system of claim 1, wherein the fiber detector is a waveguide.

5. The system of claim 1, wherein the interaction of the evanescent light wave with the air in the environment diminishes at least one spectral characteristic of light.

6. The system of claim 1, wherein a first wavelength of the general illumination light emitted by the light source is different from a second wavelength of the light outputted by the spectrometer light source.

7. The system of claim 6, wherein the general illumination light is a natural light.

8. The system of claim 6, wherein the general illumination light is an artificial light.

9. The system of claim 1, wherein the second processor is configured to control the general illumination light emitted by the light source integrated within the second lighting device, based on at least one of the selectively detected plurality of different environmental conditions.

10. The system of claim 1, further comprising:
a network communication interface coupled to the second processor,
wherein the second processor is further configured to communicate the processed spectral power distribution measurements corresponding to at least one of the selectively detected plurality of different environmental conditions over a network via the network communication interface.

11. The system of claim 1, wherein the spectrometer light source of the respective first and second lighting devices output light one at a time through the fiber detector.

12. The system of claim 1, wherein the spectrometer light source of the respective first and second lighting devices output light simultaneously through the fiber detector.

* * * * *